United States Patent
Wu

(10) Patent No.: US 11,356,903 B2
(45) Date of Patent: Jun. 7, 2022

(54) DEVICE AND METHOD OF CONFIGURING A HANDOVER

(71) Applicant: Google LLC, Mountain View, CA (US)

(72) Inventor: Chih-Hsiang Wu, Taoyuan (TW)

(73) Assignee: Google LLC, Mountain View, GA (US)

(*) Notice: Subject to any disclaimer, the term of this patent is extended or adjusted under 35 U.S.C. 154(b) by 124 days.

(21) Appl. No.: 16/534,909

(22) Filed: Aug. 7, 2019

(65) Prior Publication Data

US 2020/0053601 A1    Feb. 13, 2020

Related U.S. Application Data

(60) Provisional application No. 62/715,899, filed on Aug. 8, 2018.

(51) Int. Cl.
*H04W 36/00* (2009.01)
*H04W 36/08* (2009.01)

(52) U.S. Cl.
CPC ... *H04W 36/0016* (2013.01); *H04W 36/0058* (2018.08); *H04W 36/08* (2013.01)

(58) Field of Classification Search
CPC . H04W 36/08; H04W 36/0055; H04W 92/20; H04W 36/0016; H04W 36/0058
See application file for complete search history.

(56) References Cited

U.S. PATENT DOCUMENTS

| | | | |
|---|---|---|---|
| 8,442,533 B2 | 5/2013 | Neubacher | |
| 9,271,194 B2 | 2/2016 | Lu et al. | |
| 9,756,531 B2 | 9/2017 | Oark et al. | |
| 2011/0164593 A1 | 7/2011 | Huet et al. | |
| 2015/0172988 A1* | 6/2015 | Lai | H04W 36/00837 455/436 |

(Continued)

FOREIGN PATENT DOCUMENTS

| | | |
|---|---|---|
| WO | 2008157717 | 12/2008 |
| WO | 2012162353 | 11/2012 |

(Continued)

OTHER PUBLICATIONS

"3GPP TS 38.300 V1.1.0", 3GPP TS 38.300 V1.1.0, Oct. 2017, Oct. 2017, 59 pages.

(Continued)

*Primary Examiner* — Brandon J Miller
(74) *Attorney, Agent, or Firm* — Colby Nipper PLLC

(57) ABSTRACT

This document describes methods and devices for a handover of a user equipment (110) from source base station (a Fifth Generation (5G) New Radio (NR) base station (121)) to a target base station (another 5G NR base station (123) or an Evolved Packet Core (EPC) network base station (122)). The source base station (121), which is in communication with the user equipment (110), determines to handover the user equipment (110) to the target base station (123,122). The source base station (121), then determines whether to use a delta configuration or a full configuration for handing over the user equipment (110). For the full configuration, the source base station (121) either excludes the delta configuration from, or indicates use of the full configuration in, handover preparation information. By so doing, the source base station (121) enables handover of the user equipment (110) to the target base station (123,122).

25 Claims, 15 Drawing Sheets

(56) References Cited

U.S. PATENT DOCUMENTS

| | | | |
|---|---|---|---|
| 2015/0181481 A1 | 6/2015 | Masini et al. | |
| 2015/0245255 A1 | 8/2015 | Van et al. | |
| 2016/0029268 A1 | 1/2016 | Gomes et al. | |
| 2016/0105831 A1* | 4/2016 | Masini | H04W 36/24 |
| | | | 455/436 |
| 2017/0156085 A1 | 6/2017 | Bufe et al. | |
| 2017/0188269 A1* | 6/2017 | Sunel | H04W 36/0005 |
| 2018/0035337 A1* | 2/2018 | Kitazoe | H04L 41/0806 |
| 2018/0115932 A1 | 4/2018 | Gomes et al. | |
| 2018/0227811 A1* | 8/2018 | Nagasaka | H04W 36/0066 |
| 2018/0255496 A1* | 9/2018 | Kim | H04W 76/27 |
| 2018/0288666 A1 | 10/2018 | Fujishiro et al. | |
| 2018/0317137 A1* | 11/2018 | Loehr | H04W 36/023 |
| 2019/0007879 A1* | 1/2019 | Baek | H04W 36/30 |
| 2019/0037635 A1* | 1/2019 | Guo | H04W 76/19 |
| 2019/0357097 A1* | 11/2019 | Rugeland | H04W 12/041 |
| 2020/0178068 A1* | 6/2020 | Muhanna | H04L 63/205 |

FOREIGN PATENT DOCUMENTS

| | | | |
|---|---|---|---|
| WO | 2014019740 | 2/2014 | |
| WO | 2017119919 | 7/2017 | |
| WO | 2017148212 | 9/2017 | |
| WO | 2018127477 | 7/2018 | |
| WO | WO-2018203734 A1 * | 11/2018 | H04W 28/02 |
| WO | 2021101638 | 5/2021 | |

OTHER PUBLICATIONS

"Delivery of HO Command", 3GPP TSG-RAN WG 2 meeting #58-bis, Orlando, Florida, USA, Jun. 25-29, 2007, Jun. 2007, 3 pages.

"Full Configuration in EN-DC", 3GPP TSG-RAN WG2 #100, Reno, Nevada, Nov. 27-Dec. 1, 2017, Nov. 2017, 6 pages.

"International Search Report and Written Opinion", PCT Application No. PCT/US2019/045643, Nov. 12, 2019, 19 pages.

"TP on Support of Delta Configuration During Handover", 3GPP TSG-RAN WG3 Meeting #ADhoc1801, Sophia Antipolis, France, Jan. 22-26, 2018, Jan. 2018, 5 pages.

"3rd Generation Partnership Project; Technical Specification Group Radio Access Network; NR; NR and NG-RAN Overall Description; Stage 2 (Release 15)", 3GPP TS 38.300 V15.2.0, Jun. 2018, 87 pages.

"TP on Suppor of Delta Configuration During Handover Procedure", 3GPP TSG-RAN WG3 Meeting #ADhoc1801 R3-180191 Sophia Antipolis, France, Jan. 22-26, 2018, Jan. 2018, 5 pages.

"Foreign Office Action", Taiwanese Application No. 108128397, Jun. 3, 2020, 35 pages.

"Technical Specification Group Radio Access Network—Study on further enhancements to LTE Device to Device (D2D) User Equipment (UE) to network relays, for Internet of Things (IoT) and wearables", 3GPP TR 36.746 V15.1.1 (Release 15), Apr. 2018, 55 pages.

"Foreign Office Action", Taiwanese Application No. 108128397, dated Apr. 9, 2021, 4 pages.

"Group Mobility for Wearable Devices", R3-171749, May 2017, 3 pages.

"International Preliminary Report on Patentability", Application No. PCT/US2019/045643, dated Feb. 9, 2021, 12 pages.

"International Search Report and Written Opinion", Application No. PCT/US2020/055397, dated Feb. 4, 2021, 19 pages.

"Foreign Office Action", TW Application No. 108128397, dated Jun. 7, 2021, 14 pages.

"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.

"Foreign Office Action", IN Application No. 202147006420, dated Jan. 17, 2022, 6 pages.

"NR and NG-RAN Overall Description", 3GPP TS 38.300 version 16.2.0 Release 16, Jul. 2020, 150 pages.

\* cited by examiner

DEVICE AND METHOD OF CONFIGURING A HANDOVER

RELATED APPLICATION

This application claims priority to U.S. Provisional Patent Application Ser. No. 62/715,899 filed Aug. 8, 2018, the disclosure of which is incorporated by reference herein in its entirety.

BACKGROUND

The evolution of wireless communication to fifth generation (5G) standards and technologies provides higher data rates and greater capacity with improved reliability and lower latency, which enhances mobile broadband services. 5G technologies also provide new classes of service for vehicular networking, fixed wireless broadband, and the Internet of Things (IoT).

Use of 5G technologies, however, presents certain challenges, such as those involving handover techniques. Conventional handover techniques used for Evolved Universal Terrestrial Radio Access (E-UTRA) networks, for example, do not properly address handovers within 5G networks or between 5G and E-UTRA networks.

SUMMARY

This summary is provided to introduce simplified concepts for configuring a handover. The simplified concepts are further described in the Detailed Description below. This summary is not intended to identify essential features of the claimed subject matter nor is it intended for use in determining the scope of the claimed subject matter.

Methods, devices, systems, and means for configuring a handover are described, including communicating, by the 5G NR source base station, with a user equipment device (UE) based on a first plurality of configurations and determining, based on a measurement report from the UE, to handover the UE from the 5G NR source base station to the target base station. Also included are sending, to the target base station, a first interface message including a Handover Preparation Information message, receiving, by the 5G NR source base station, a second interface message, the second interface message containing a Radio Resource Control (RRC) message, and determining, by the 5G NR source base station, whether to use configuration information received in the second interface message as a delta configuration or a full configuration for handing over the UE to the target base station. Responsive to determining to use the configuration information received in the second interface message as a full configuration, indicating, in the Radio Resource Control (RRC) message to the UE, to use the configuration information as a full configuration, the indicating effective to complete the handover from the 5G NR source base station to the target base station. Responsive to determining to not use the configuration information as a full configuration, the methods, device or means use the configuration information as a plurality of delta configurations.

There is provided a method for performing a handover from a source base station to a target base station, the method comprising: communicating, by the source base station, with a user equipment based on a first configuration of a first plurality of configurations corresponding to a current user equipment configuration of the user equipment; determining, based on for example a measurement report from the user equipment, to perform the handover of the user equipment from the source base station to the target base station; determining, by the source base station, whether to use configuration information as a delta configuration that corresponds to modifying the first configuration or first plurality of configurations, or a full configuration that corresponds to replacing the first configuration or first plurality of configurations with second configuration information, for the performing the handover of the user equipment; configuring a radio resource control message based on the determining whether to use the configuration information as the delta configuration or the full configuration; and transmitting, to the user equipment, the configured radio resource control message to direct the user equipment to modify the current user equipment configuration, based on the configuration information, for the performing the handover. The method may further comprise one or more of the following: determining one or more factors associated with performing the handover that affect the first configuration or first plurality of configurations; preparing a Handover Preparation Information message by determining, for example based on the one or more factors, whether to include one or more conditionally present fields in the Handover Preparation Information message; generating a first interface message that includes the prepared Handover Preparation Information message; sending, to the target base station, the first interface message; receiving, by the source base station, a second interface message, the second interface message including the radio resource control message.

BRIEF DESCRIPTION OF THE DRAWINGS

Aspects for configuring a handover are described with reference to the following drawings. The same numbers are used throughout the drawings to reference like features and components:

FIGS. 4-1 and 4-2 illustrate an example method for configuring a handover from a perspective of a 5G NR source base station, the example method including use of a full configuration.

FIGS. 5-1 and 5-2 illustrate another example method for configuring a handover from a perspective of a 5G NR source base station, the example method including use of a delta configuration.

FIGS. 8-1 and 8-2 illustrate an example method for configuring a handover from a perspective of a 5G NR source base station.

FIGS. 10-1 and 10-2 illustrate an example method for configuring a handover from a perspective of a source base station, and relating to methods of FIGS. 3, 4-1 and 4-1, 5-1 and 5-1, and 8-1- and 8-2.

DETAILED DESCRIPTION

Overview

Figure 1:
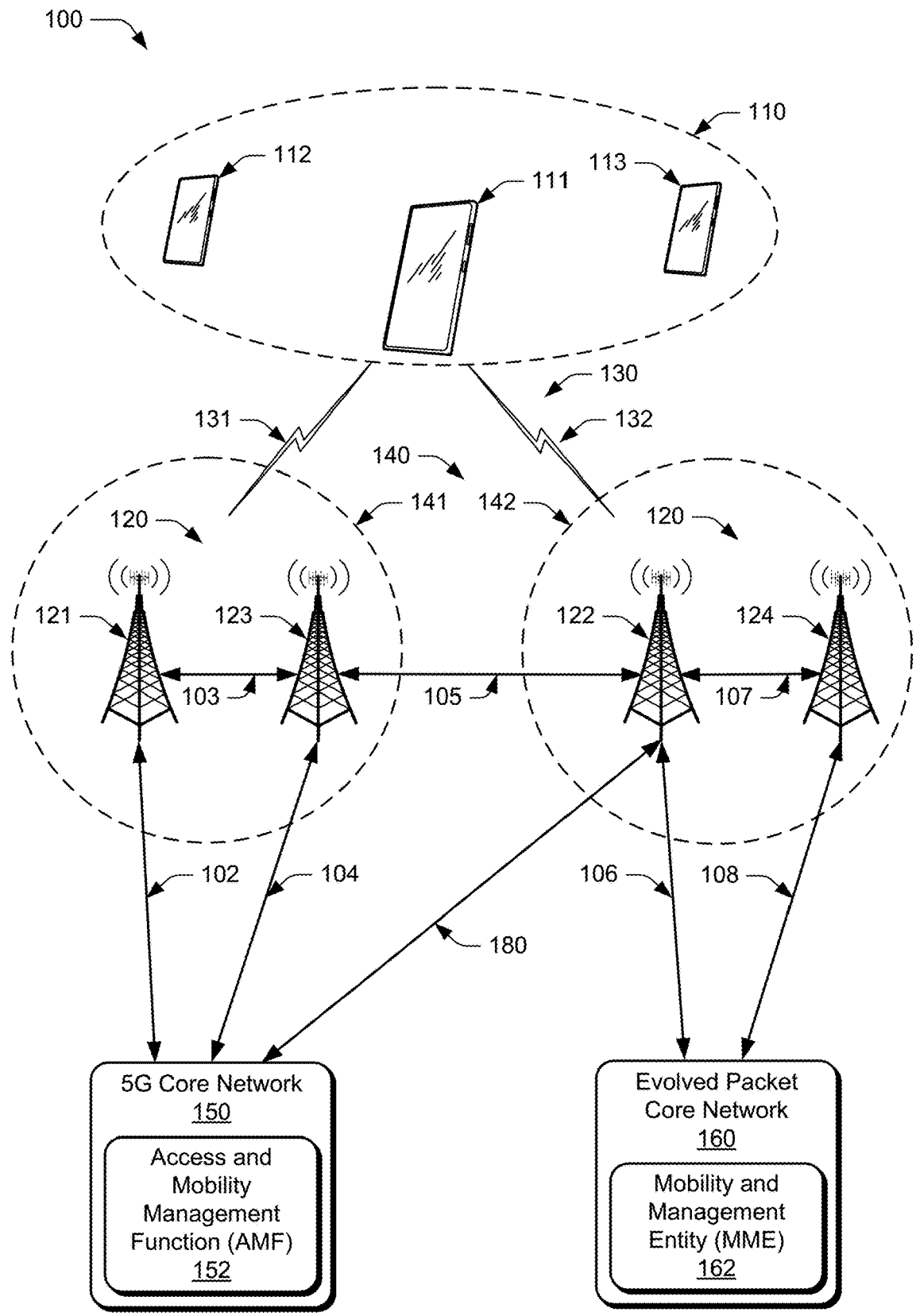
FIG. 1 illustrates an example wireless network environment in which various aspects for configuring a handover can be implemented.

This document describes methods, devices, systems, and means for a handover of a user equipment (UE) from a source base station (a Fifth Generation (5G) New Radio (NR) base station) to a target base station (another 5G NR base station or a base station corresponding to an Evolved Packet Core (EPC) network base station (e.g., an Evolved Universal Terrestrial Radio Access (E-UTRA) base station). The source base station, which is in communication with the user equipment, determines to hand over the user equipment to the target base station (with or without input from the user equipment). The source base station then determines whether to use a delta configuration or a full configuration for handing over the user equipment. For the full configuration, the source base station either excludes a current user equipment configuration from, or indicates use of the full configuration in, handover preparation information. By doing so, the source base station enables the handover of the user equipment to the target base station.

Consider, for example, a situation where a user equipment, such as a smartphone, is in communication with a 5G NR base station. Assume that the communication quality with the base station is degrading or insufficient, such as if the smartphone is moving relative to that base station. The smartphone may send a measurement report to the base station indicating, among other things, current conditions, configurations, or even preferred target base stations that may provide improved communication relative to the current base station.

In such a case, a handover of the smartphone from the current (source) base station to a (target) base station is desired. As noted above, however, conventional techniques for handovers are insufficient for handing over a user equipment from a 5G NR base station to another 5G NR base station or an LTE base station (e.g., a base station associated with an E-UTRA or Evolved Patent Core network).

In LTE-to-LTE handovers, conventional techniques include passing of a delta configuration from a target LTE base station to a source LTE base station. These delta configurations include details about a change, or delta, to a current user equipment configuration with the source in order to complete a handover to the target. This change can be required due to various factors, such as the source and target base stations being different, e.g., being manufactured by different makers, having different protocols, and so forth.

Passing of a current user equipment configuration currently configured to the UE from the source to the target, in the case of 5G NR to 5G NR or E-UTRA base stations, however, is often insufficient or ambiguous to the target base station given that the target has to understand the user equipment configuration and decides whether to reuse that configuration. Because of this, techniques for establishing handovers when a delta configuration is not sufficient are desired and disclosed herein.

While features and concepts of the described systems and methods for handovers can be implemented in any number of different environments, systems, and/or devices, aspects of these handover techniques are described in the context of the following example devices and systems.

Example Environment

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
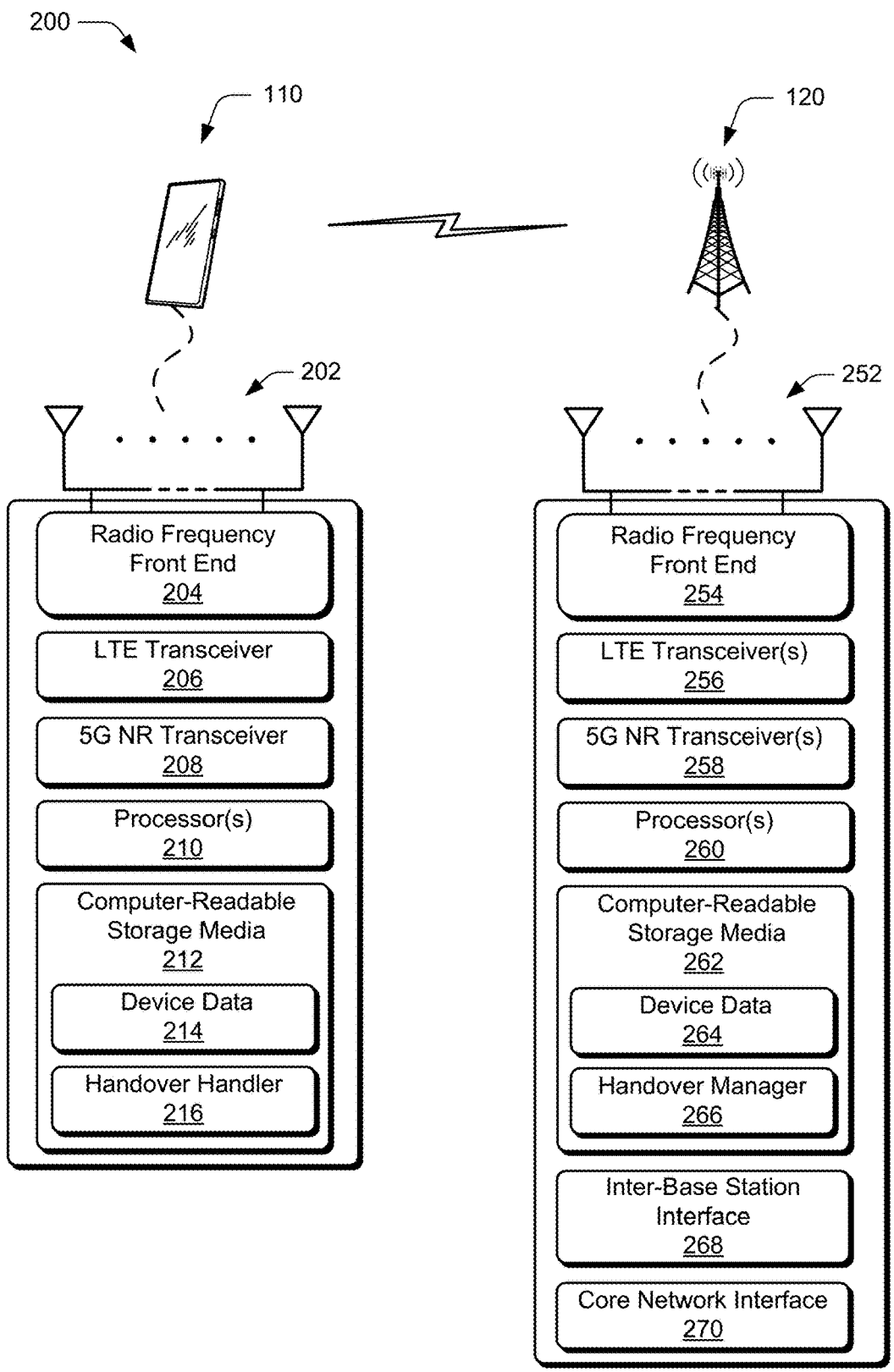
FIG. 2 illustrates an example device diagram for devices that can implement various aspects for configuring a handover in the example wireless network environment of FIG. 1.

FIG. 2 illustrates an example device diagram 200 of the UE 110 and the base stations 120. The UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory usable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes instructions for implementing a handover handler 216. Alternately or additionally, the handover handler 216 may be implemented in whole or part as hardware logic or circuitry integrated with or separate from other components of the UE 110. In at least some aspects, the handover handler 216 configures the RF front end 204, the LTE transceiver 206, and/or the 5G NR transceiver 208 to implement the techniques for configuring a handover described herein.

The device diagram for the base stations 120, shown in FIG. 2, includes a single network node or multiple network nodes (e.g., eNB, a gNode B or next generation eNB). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory usable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes instructions for implementing a handover manager 266. Alternately or additionally, the handover manager 266 may be implemented in whole or part as hardware logic or circuitry integrated with or separate from other components of the base stations 120. In at least some aspects, the handover manager 266 performs, in whole or in part when acting as a source base station, the techniques described herein. The handover manager 266 configures the LTE transceivers 256 and the 5G NR transceivers 258 for communication with the UE 110, as well as communication with a core network. The base stations 120 include an inter-base station interface 268, such as an Xn and/or X2 interface, which the handover manager 266 configures to exchange user-plane and control-plane data between another base station 120 (including handovers between them), to manage the communication of the base stations 120 with the UE 110. The base stations 120 include a core network interface 270 that the handover manager 266 configures to exchange user-plane and control-plane data with core network functions and entities.

Example Methods

Example methods 300-900 are described with reference to FIGS. 3-9 in accordance with one or more aspects for configuring a handover. The order in which the method blocks are described are not intended to be construed as a limitation, and any number of the described method blocks can be combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Configuring a Handover

Figure 3:
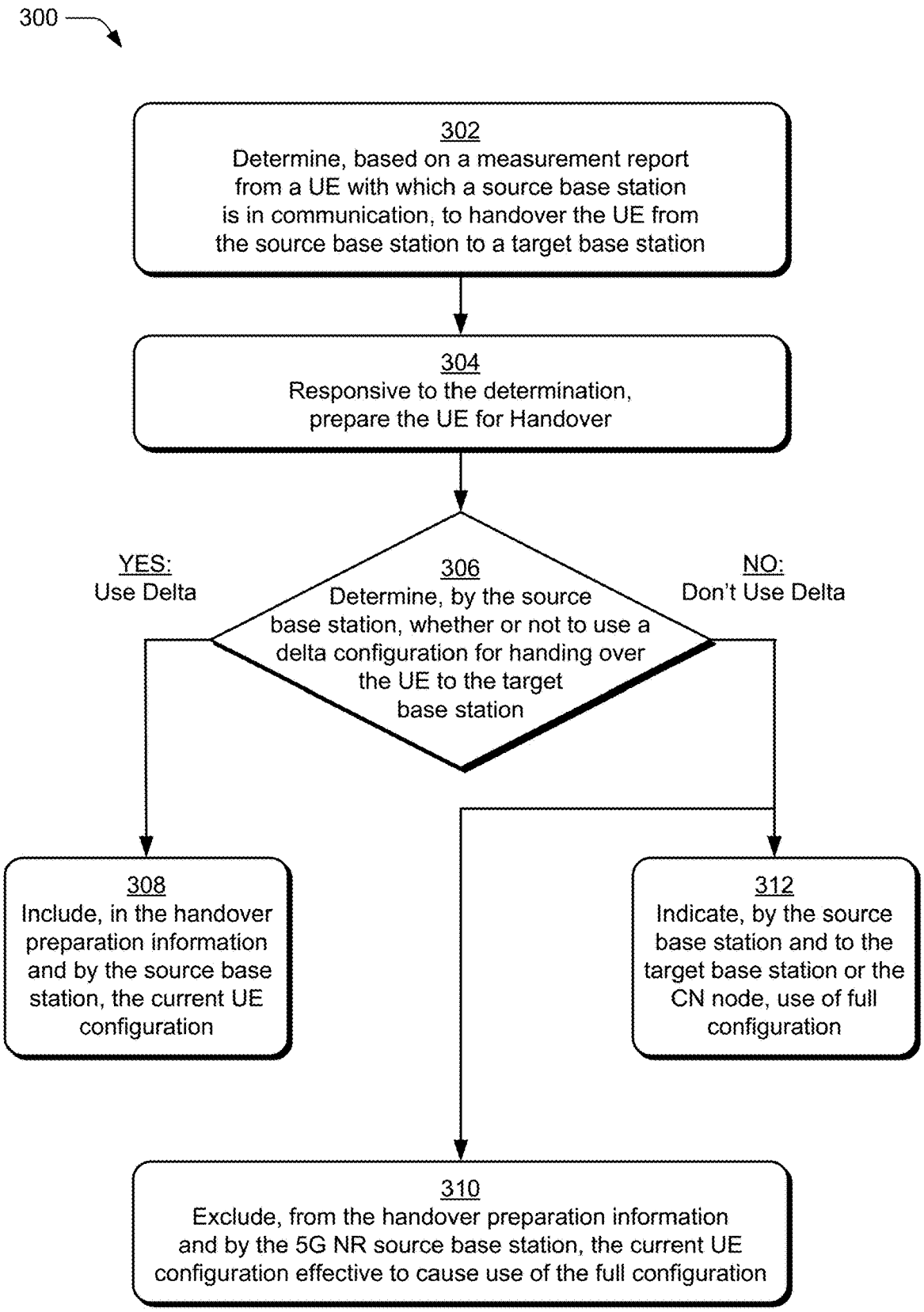
FIG. 3 illustrates an example method for configuring a handover.

FIG. 3 illustrates example method(s) 300 for configuring a handover as generally related to protocol processing by the source base station in a handover in accordance with aspects of the techniques described herein.

At block 302, a source base station determines, based on a measurement report from a connected user equipment (e.g., UE 111) with which the source base station (e.g., gNB base station 121) is in communication, to handover the UE from the source base station to a target base station (e.g., ng-eNB base station 122, gNB base station 123, or eNB base station 124). In one example, a 5G NR source base station (e.g., gNB base station 121) determines, based on a measurement report from a UE with which the 5GNR source base station is in communication, to handover the UE from the 5G NR source base station to a 5G NR target base station (e.g., gNB base station 123) or an E-UTRA target base station (e.g., ng-eNB base station 122 or eNB base station 124). In another example, an E-UTRA source base station (e.g., ng-eNB base station 122 or eNB base station 124) determines, based on a measurement report from the UE with which the E-UTRA source base station is in communication, to handover the UE (e.g., UE 111) from the E-UTRA source base station to a 5GC NR target base station (e.g., gNB base station 121).

At block 304, the source base station may prepare the UE for handover. This is further described below, including with blocks in methods 400, 500, and 800.

At block 306, the source base station determines whether or not to use a delta configuration for handing over the UE to the target base station. This determination can be based on various factors, including, by example only, specifications for the target base station, whether the target base station is a gNB, an ng-eNB, or an eNB base station, carrier frequency (e.g., NR carrier frequency, NR radio band, E-UTRA carrier frequency, E-UTRA radio band) of the target base station, a core network (e.g., EPC or 5GC) of the target base station, manufacturer, supported protocols and protocol versions, and so forth. Effectively, the techniques may determine that a delta configuration is sufficient (this is often the case for LTE-to-LTE handovers), or that a delta configuration is not sufficient.

If the delta configuration is not sufficient, the source base station (e.g., the handover manager 266 of FIG. 2), determines to use a full configuration. The full configuration may require the target base station to determine which configuration will work for communication between the UE and the target base station, which as noted can vary substantially based on the UE and the target base station. Thus, a UE may be incapable of some types of communication with the target base station, and thus the target base station may have to determine which configuration is appropriate according to capabilities of the UE.

At block 308, based on determining to use the delta configuration, the source base station includes, in a handover preparation information message, the current UE configuration. This current UE configuration is configured to the UE and has been used by the UE to communicate with the source base station. This current UE configuration is a configuration enabling communication between the user equipment and the source base station, and therefore often is not equivalent to the delta configuration or the full configuration.

At block 310, the source base station, responsive to determining to use the full configuration, excludes the current UE configuration from the handover preparation information message sent to the target base station. This can be effective to cause the target base station to determine an appropriate configuration, as noted above, because no current UE configuration exists in the message. One advantage to not sending the current UE configuration is fewer resources being needed because the handover preparation information message-size decreases. Thus, the communication costs can be lower when forgoing the UE configuration for the source base station and core network nodes involved in preparing the handover.

At block 312, alternatively or in addition to block 310, the source base station, responsive to determining to use the full configuration, indicates, in the handover preparation information, to use the full configuration. This causes the target base station to determine an appropriate full configuration.

Figures 1, 4:
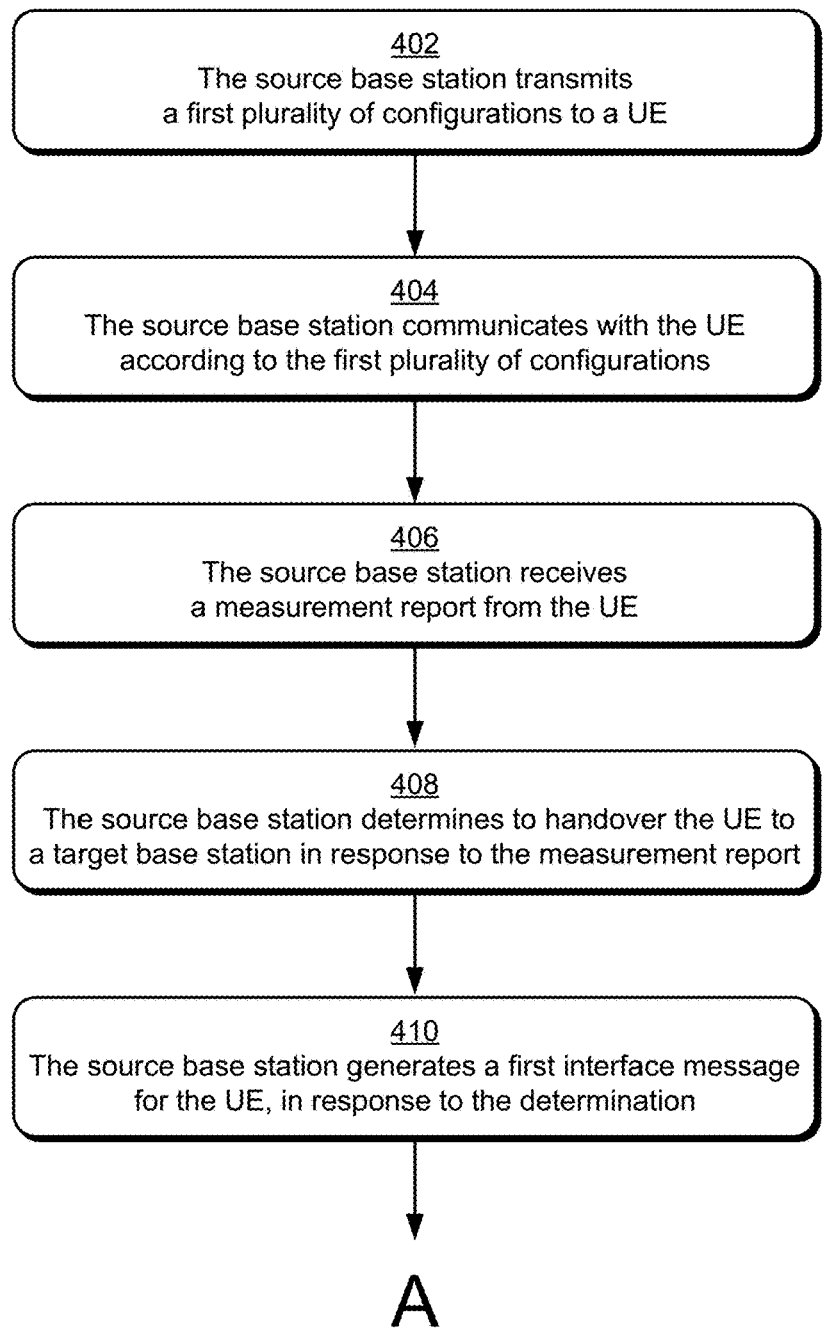
Figures 2, 4:
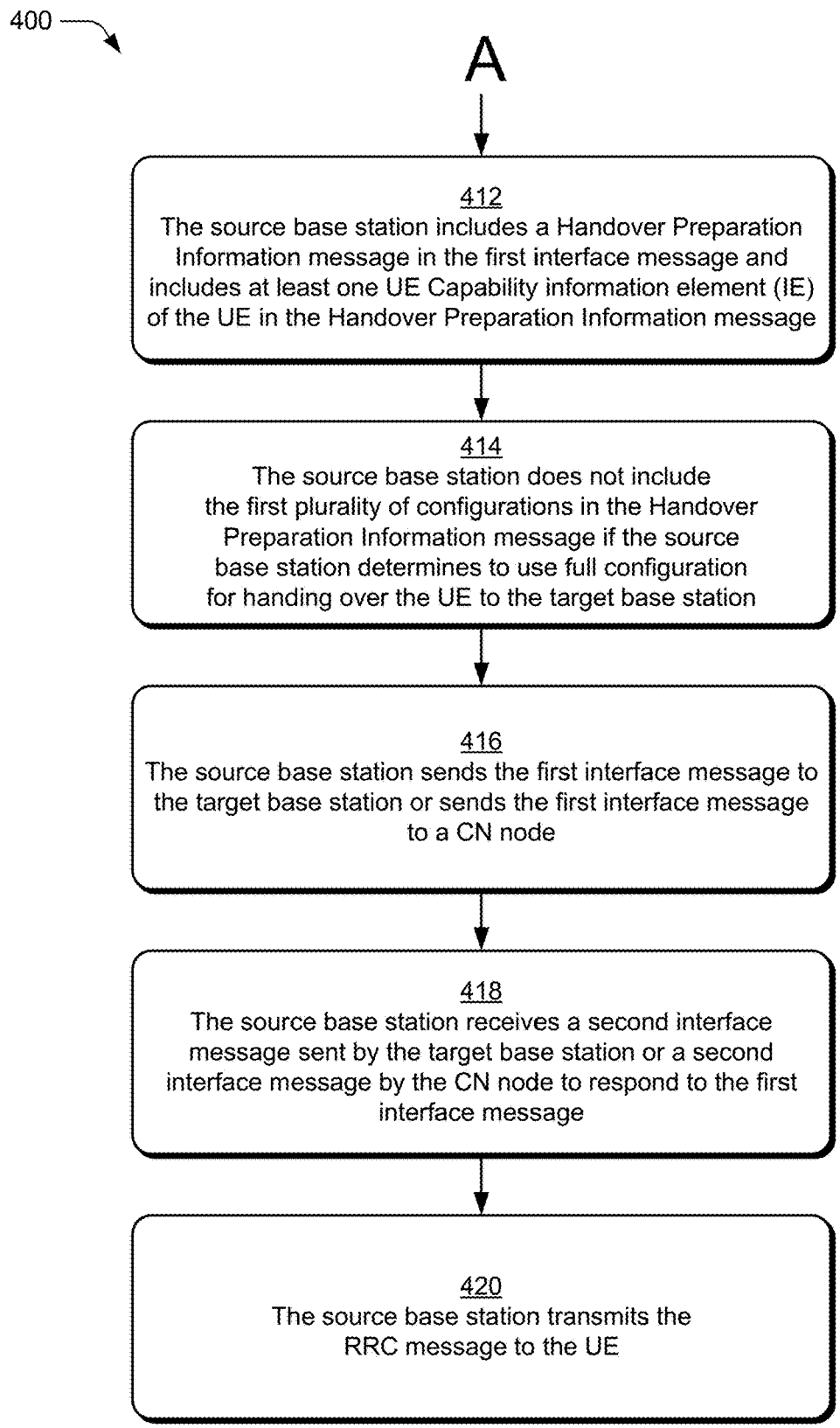

FIGS. 4-1 and 4-2 illustrates example method(s) 400 for configuring a handover as generally related to using a full configuration and excluding a delta configuration from a handover preparation information. FIG. 4 provides further details with respect to the FIG. 3 flow-diagram branch where a delta configuration will not be used.

At block 402, a source base station transmits a first plurality of configurations to a user equipment (UE). This first plurality of configurations is not equivalent to a second plurality of configurations, e.g., a full or delta configuration, which are described in greater detail below. Thus, the original configuration settings, also referred to as the current UE configuration, should not be confused with full or delta configurations. In one example, the 5G NR base station (e.g., gNB base station 121) transmits configurations to the UE 111 to establish communication between the source base station and the UE, which results in current UE configurations being established. In another example, the E-UTRA base station (e.g., ng-eNB base station 122 or eNB base station 124) transmits configurations to the UE (e.g., UE 111). In one example, the first plurality of configurations includes a measurement configuration or the measurement report, which is associated with the measurement configuration. The first plurality of configurations may include at least one of: a physical layer configuration, a medium access control (MAC) configuration, a radio link control (RLC) configuration, or a radio bearer (RB) configuration.

At block 404, the source base station communicates with the UE according to the first plurality of configurations. These configurations are noted in part above, and the first plurality of configurations permit communication to be established between the source base station and the UE (e.g., the gNB base station 121 and the UE 111, the ng-eNB base station 122 and UE 111, or the eNB base station 124 and UE 111).

At block 406, the source base station receives, from the UE, a measurement report. This report can be any of those described previously.

At block 408, the source base station determines to hand over the UE to a target base station in response to measurement report. Assume here that measurement report indicated a poor connection with the source base station, a good signal strength of the target base station, a request to switch to another base station, and so forth. Alternately or in addition, in determining to hand over the UE to the target base station, the source base station determines and/or analyzes any combination of factors, such as the type of the target base station (e.g., 5G NR, E-UTRA), a carrier frequency of the target base station, a core network of the target base station, a manufacturer, supported protocols and protocol versions, etc. Blocks 402, 404, 406, and 408 provide precursors and details to FIG. 3 block 302.

With reference to block 304 of FIG. 3, at block 410, which may be combined with block 412, the source base station generates a first interface message for the UE in response to the determination at block 408. At block 412, the source base station includes a Handover Preparation Information message in the first interface message and includes at least one UE Capability information element (IE) of the UE in the Handover Preparation Information message. The at least one UE Capability IE includes NR capabilities of the UE or E-UTRA capabilities of the UE.

With reference to block 310 of FIG. 3, at block 414, the source base station does not include the first plurality of configurations (mentioned previously with respect to blocks 402, 404) in the Handover Preparation Information message if the source base station determines to use full configuration for handing over the UE to the target base station.

At block 416, the source base station sends the first interface message (e.g., a Handover Request message) to the target base station or sends the first interface message (e.g., a Handover Required message) to a CN (core network) node, such as the AMF 152 or the MME 162. In more detail, the CN node is the AMF 152 for a handover from the 5G NR base station to the E-UTRA base station. The CN node, for a handover from a 5G NR base station to another 5G NR base station is also the AMF 152. The CN node is either the AMF 152 or the MME 162 for a handover from the E-UTRA base station to the NR base station. Thus, the source base station (e.g., the gNB base station 121 or the ng-eNB base station 122) sends the first interface message to the target base station (e.g., the gNB base station 123 or the eNB base station 124).

At block 418, the source base station receives a second interface message (e.g., a Handover Request Acknowledge message) sent by the target base station or a second interface message (e.g., a Handover Command message) sent by the CN node (here a source CN node) in response to the first interface message being sent by the source base station. The second interface message includes a Radio Resource Control (RRC) message for the UE to handover to the target base station. The target base station may generate a second plurality of configurations in the RRC message for the UE according to the at least one UE Capability IE of the UE. As noted previously, the second plurality of configurations is in contrast to the current UE configurations.

With reference to block 312 of FIG. 3, at block 420, the source base station transmits the RRC message with a full configuration indicator to the UE to direct the UE to handover to the target base station. Note that this RRC message is a RRC handover command message, such as an RRCConnectionReconfiguration message for handover from NR to E-UTRA (e.g., from gNB base station 121 to ng-eNB base station 122 or 124) or an RRCReconfiguration message for handover from E-UTRA to NR (e.g., from ng-eNB to base station 122 or eNB base station 124 to gNB base station 121) or for handover from NR to NR (e.g., from gNB base station 121 to gNB base station 123). In more detail, the UE may release a MAC or RLC entity responsive to receiving the RRC message. In one example, the RRC message may include a first RRC Reconfiguration message. The first RRC Reconfiguration message may comprise a ReconfigurationWithSync IE. The first RRC Reconfiguration message includes the second plurality of configurations, which is applied by the UE as a full configuration (e.g., without reference the first plurality of configurations sent at block 402). The second plurality of configurations may include at least one of: a random access channel (RACH) configuration, a physical layer configuration, a MAC configuration, an RLC configuration, or an RB configuration. This second plurality of configurations may be different from the first plurality of configurations sent at block 402. Note that this does not preclude the second plurality of configurations from having at least one configuration in common with the first plurality of configurations. In implementations, the source base station analyzes the combination of factors associated with performing the handover that affect the first plurality of configurations (e.g., the type of the target base station, a carrier frequency of the target base station, a core network of the target base station, a manufacturer, supported protocols and protocol versions, etc.) to assemble and/or modify the RRC message transmitted to the UE.

In one example of the above method 400, the source base station may determine to (or be configured to) use the full configuration, such as when the target base station does not support a delta configuration. Thus, the source base station may determine to (or be configured to) use the full configuration since the source and target base stations are made by different network vendors. Because the target base station may not recognize one or more configurations of the first plurality of configurations, the source base station may select a full configuration. Another reason for the source base station selecting a full configuration is if the target base station received the first plurality of configurations, the target base station would produce an error while decoding the first plurality of configurations.

Further, in a case where the handover involves the AMF (e.g., 152) between two 5G NR base stations (e.g., 121,123) or between a 5G NR base station (e.g., 121) and an E-UTRA base station (e.g., 122), the AMF receives the first interface message (e.g., a Handover Required message) and may send a third interface message (e.g., a Handover Request message) to the target base station in response to the first interface message. The third interface message may include the Handover Preparation Information message. The target base station sends a fourth interface message (e.g., a Handover Request Acknowledge message) to the AMF in response to the third interface message. The fourth interface message may include the RRC message. The AMF 152 sends the second interface message (e.g., a Handover Command message including the RRC message) to the source base station in response to the fourth interface message.

Further still, in a case where the handover involves an inter-CN handover (e.g., handover from 5GC to EPC or handover from EPC to 5GC), such as handover from a 5G NR base station to an E-UTRA target base station (through the AMF 152 and the MME 162 of FIG. 1), or handover from an E-UTRA target base station to a 5G NR base station (through MME 162 and AMF 152 of FIG. 1), the source CN node (e.g., AMF 152 or MME 162) sends a third interface message (e.g., a Forward Relocation Request message) to a target CN node (e.g., MME 162 or AMF 152). The third interface message requests handing over a UE to the target base station and includes a Handover Preparation Information message. The target CN node sends a fourth interface message (e.g., the Handover Request message) to the target base station in response to the third interface message. The fourth interface message includes the Handover Preparation Information message for handing over the UE to the target base station. The target CN node receives a fifth interface message (e.g., the Handover Request Acknowledge message) responding to the fourth interface message from the target base station, the fifth interface message includes the RRC message for handing over the UE to the target base station. The target CN node sends a sixth interface message (e.g., a Forward Relocation Response) to the source CN node, and the sixth interface message includes the RRC message and responds to the third interface message. Then the source CN node sends the second interface message including the RRC message in response to receiving the sixth interface message.

The first interface message or the fourth interface message may include Protocol Data Unit (PDU) Session information (e.g., PDU Session Resources To Be Setup List or PDU Session Resources List). The target base station may receive the PDU Session information from the source base station via the first interface message or from the CN node via the fourth interface message, and generate one or more of the second plurality of configurations according to the PDU Session information. The target base station may generate the RB configuration in the second plurality of configurations according to the PDU Session information. For example, the RB configuration may include a PDU Session identity (ID) included in the PDU Session information.

Other examples include the Handover Preparation Information message excluding an RRC Reconfiguration message that includes the first plurality of configurations in order exclude the first plurality of configurations. In another variant, the source base station transmits at least one second RRC Reconfiguration message including the first plurality of configurations to the UE. The source base station receives from the UE at least one second RRC Reconfiguration Complete message responding to the at least one second RRC Reconfiguration message.

The UE performs a random access (RA) procedure with the target base station according to the RACH configuration of the second plurality of configurations. The target base station may receive an RRC response message (e.g., first RRC Reconfiguration Complete message) responding to the RRC message from the UE.

Figures 1, 5:
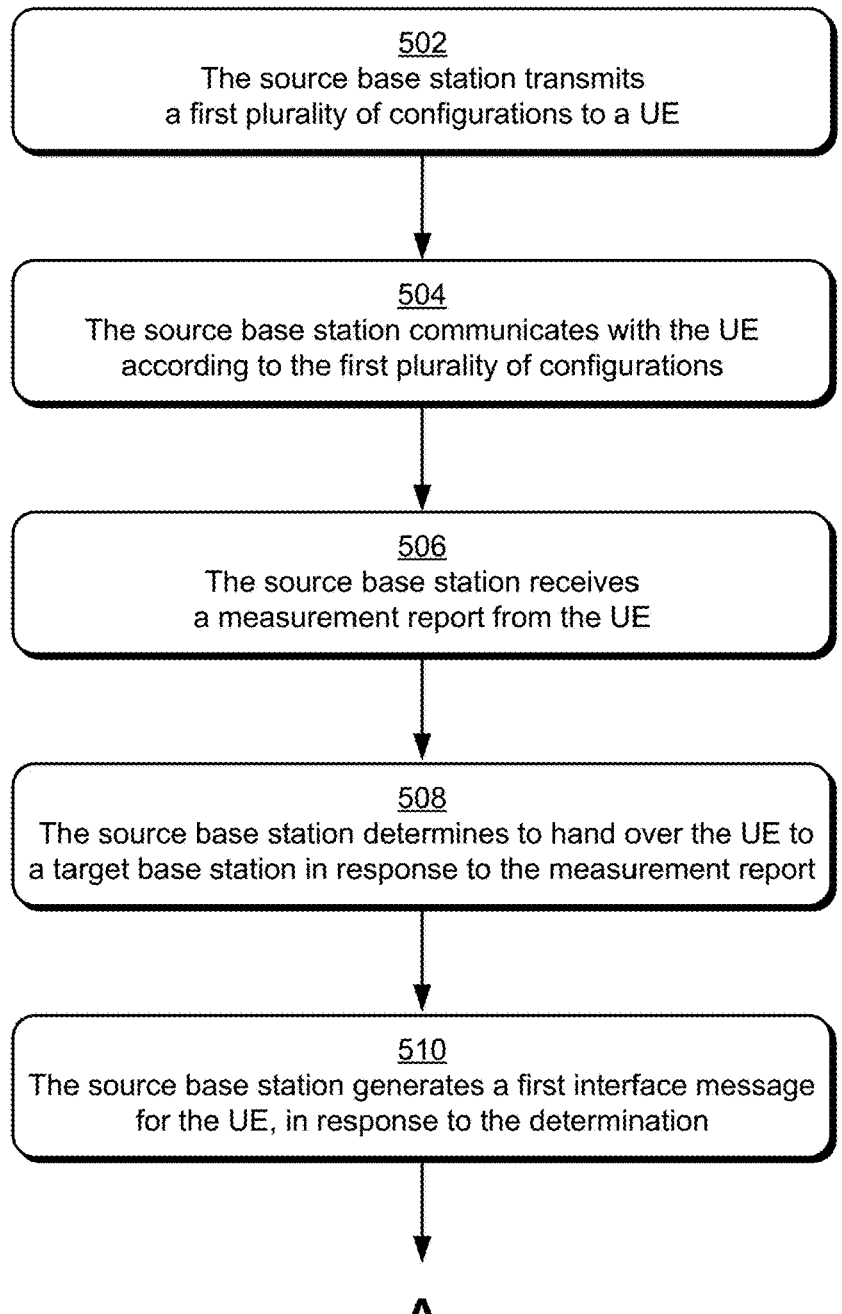
Figures 2, 5:
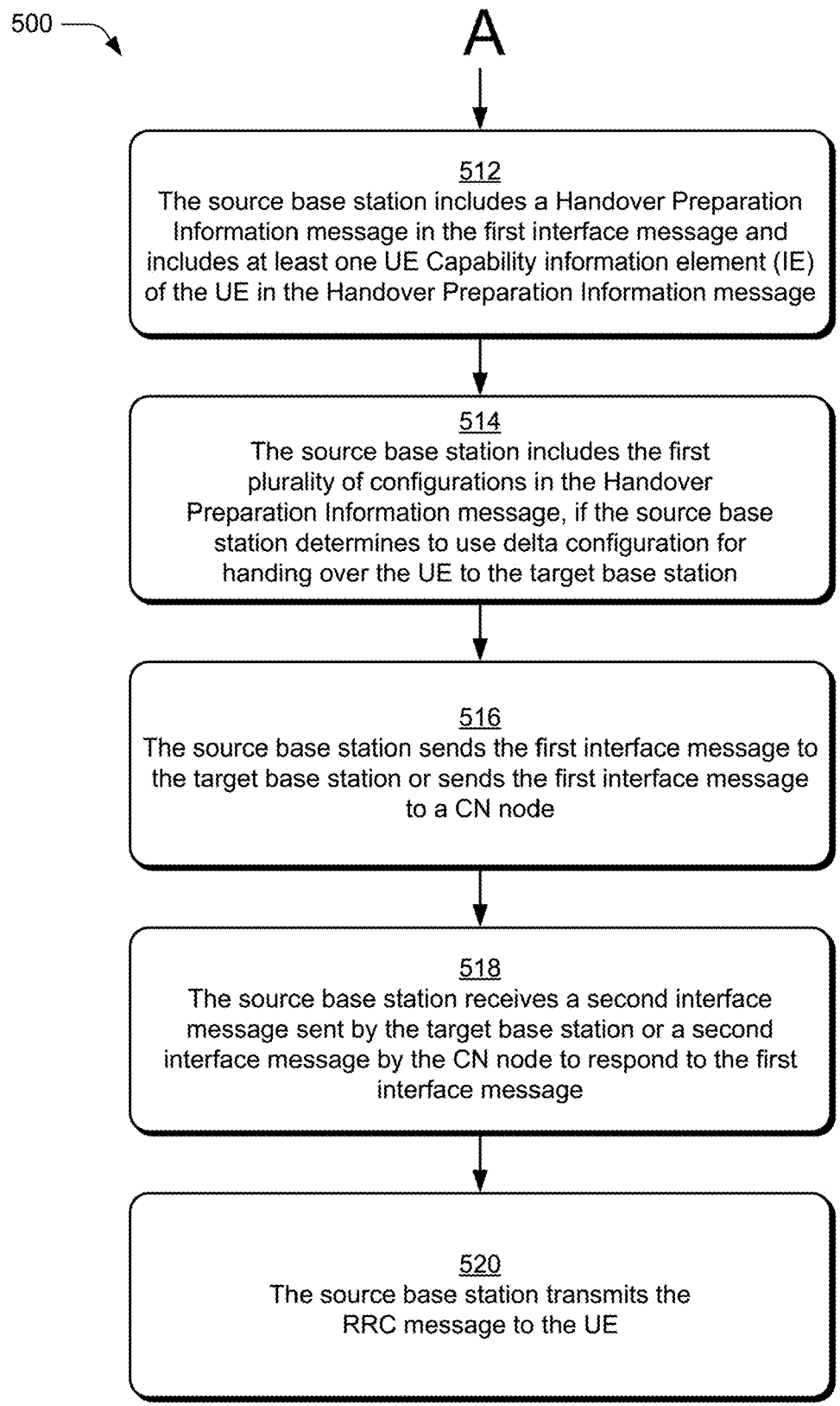

FIGS. 5-1 and 5-2 illustrates example method(s) 500 for configuring a handover as generally related to a determination to use a delta configuration in a handover. FIG. 5 provides further details with respect to the FIG. 3 flow diagram branch when a delta configuration will be used.

At block 502, a source base station transmits a first plurality of configurations to a user equipment (UE). For example, the gNB base station 121 transmits configurations to the UE 111. The first plurality of configurations includes at least one of: a physical layer configuration, a medium access control (MAC) configuration, a radio link control (RLC) configuration, and an RB configuration. These are effective to establish a current UE configuration, as noted herein, between the source base station and the UE.

At block 504, the source base station communicates with the UE according to the first plurality of configurations. These configurations are noted in part above, and permit communication to be established between the source base station and the UE (e.g., the gNB base station 121 and the UE 111).

At block 506, the source base station receives, from the UE, a measurement report. This report can be any of those described above. In one example, the first plurality of configurations sent at block 502 includes a measurement configuration and the measurement report of block 506 is associated to the measurement configuration.

With reference to block 302 of FIG. 3, at block 508, the source base station determines to handover the UE to a target base station (e.g., gNB base station 123 or ng-eNB base station 122) in response to the measurement report. Assume here that measurement report indicated a poor connection with the source base station, a good signal strength of the target base station, or a request to switch to another base station, and so forth. Alternately or in addition, in determining to hand over the UE to the target base station, the source base station determines and/or analyzes any combination of factors, such as the type of the target base station (e.g., 5G NR, E-UTRA), a carrier frequency of the target base station, a core network of the target base station, a manufacturer, supported protocols and protocol versions, etc. Blocks 502, 504, 506, and 508 provide precursors and details to FIG. 3 block 302.

With reference to block 304 of FIG. 3, at block 510, which may be combined with block 512, the source base station generates a first interface message for the UE in response to the determination at block 508. At block 512, with reference to block 308, the source base station includes a Handover Preparation Information message in the first interface message and includes at least one UE Capability information element (IE) of the UE in the Handover Preparation Information message. Note that blocks 510 and 512 may be combined. The first interface message may include Protocol Data Unit (PDU) Session information (e.g., PDU Session Resources To Be Setup List or PDU Session Resources List).

With reference to block 308 of FIG. 3, at block 514, which may be combined with blocks 510 and 512, the source base station includes the first plurality of configurations (mentioned previously with respect to blocks 502, 504) in the Handover Preparation Information message if the source base station determines to use the delta configuration for handing over the UE to the target base station. The source base station may determine to (or be configured to) use the delta configuration, if the target base station supports the delta configuration. In one example, the source base station may determine to (or be configured to) use the delta configuration since the source and target base stations are made by the same network vendors. Hence, the target base station may recognize the first plurality of configurations and create a delta configuration for the RRC message intended for the UE. Thus, the source base station includes the first plurality of configurations in the Handover Preparation Information message.

At block 516, the source base station sends the first interface message (e.g., a Handover Request message) to the target base station or sends the first interface message (e.g., a Handover Required message) to a CN (core network) node, such as the AMF 152. Thus, the source base station (e.g., the gNB base station 121) sends the first interface message to the target base station (e.g., the gNB base station 123 or the ng-eNB base station 122) or the AMF 152.

For the case where the CN node receives the first interface message, the CN node sends a third interface message (e.g., a Handover Request message) including the Handover Preparation Information message to the target base station. The target base station receives the first plurality of configurations in the Handover Preparation Information message in the first interface message or the third interface message. The target base station may generate an RB configuration in the second plurality of configurations according to one of the RB configuration(s) in the first plurality of configurations. The RB configuration may include an RB identity included in the one of the RB configuration(s) included in the first plurality of configurations. The RB configuration may include a PDU Session ID included in the one of the RB configuration(s) in the first plurality of configurations. The target base station may receive the PDU Session information from the source base station via the first interface message from the source base station or via the third interface message from the CN node. The PDU Session information may include the PDU Session ID same as the PDU Session ID included in the one of the RB configuration(s) in the first plurality of configurations.

At block 518, the source base station receives a second interface message (e.g., a Handover Request Acknowledge message) sent by the target base station or a second interface message (e.g., a Handover Command message) sent by the CN node in response to the first interface message being sent by the source base station. The second interface message includes the Radio Resource Control (RRC) message for the UE to handover to the target base station.

At block 520, the source base station transmits the RRC message to the UE. In more detail, the UE may release a MAC or RLC entity responsive to receiving the RRC message. The target base station generates the RRC message based on the first plurality of configurations. The RRC message contains a second plurality of configurations to change a subset of the first plurality of configurations, where a configuration delta is indicated because the RRC message does not include the full configuration indicator (described above and for method 800 below). The second plurality of configurations may update one or more configurations of the first plurality of configurations stored in the UE (e.g., those sent at block 502). In implementations, the source base station analyzes the combination of factors associated with performing the handover that affect the first plurality of configurations (e.g., the type of the target base station, a carrier frequency of the target base station, a core network of the target base station, a manufacturer, supported protocols and protocol versions, etc.) to assemble and/or modify the RRC message transmitted to the UE.

For example, one of the second plurality of configurations may update a single configuration in the first plurality of configurations. Thus, the second plurality of configurations may result in a new configuration not existing in the first plurality of configurations. The UE knows the second plurality of configurations contain delta configurations relative to the first plurality of configurations because the RRC message does not include a full configuration indicator. The UE updates the plurality of configurations according to the second plurality of configurations, e.g., upon successfully handing over to the target base station. The second plurality of configurations may include a ReconfigurationWithSync IE. The second plurality of configurations may include a different RACH configuration than the RACH configuration in the first plurality of configurations or a different radio network temporary identifier (RNTI) (e.g., a cell RNTI) than a RNTI (e.g., a cell RNTI) in the first plurality of configurations. The UE uses configurations included in the first plurality of configurations and not updated by the second plurality of configurations to communicate with the target base station. As noted in part above, other interface messages can be sent to the target base station in response to the first interface message, including the above-described third and fourth interface message.

In one example, the source base station transmits at least one second RRC Reconfiguration message including the second plurality of configurations to the UE. The source base station receives from the UE at least one second RRC Reconfiguration Complete message responding to the at least one second RRC Reconfiguration message. In one example, at step 514, the Handover Preparation Information contains a third RRC Reconfiguration message including the plurality of configurations to include the plurality of configurations in the Handover Preparation Information message.

Methods 400 and 500 may work separately or together in whole or in part, such as when a source base station hands over one or two UEs to two different target base stations.

Figure 6:
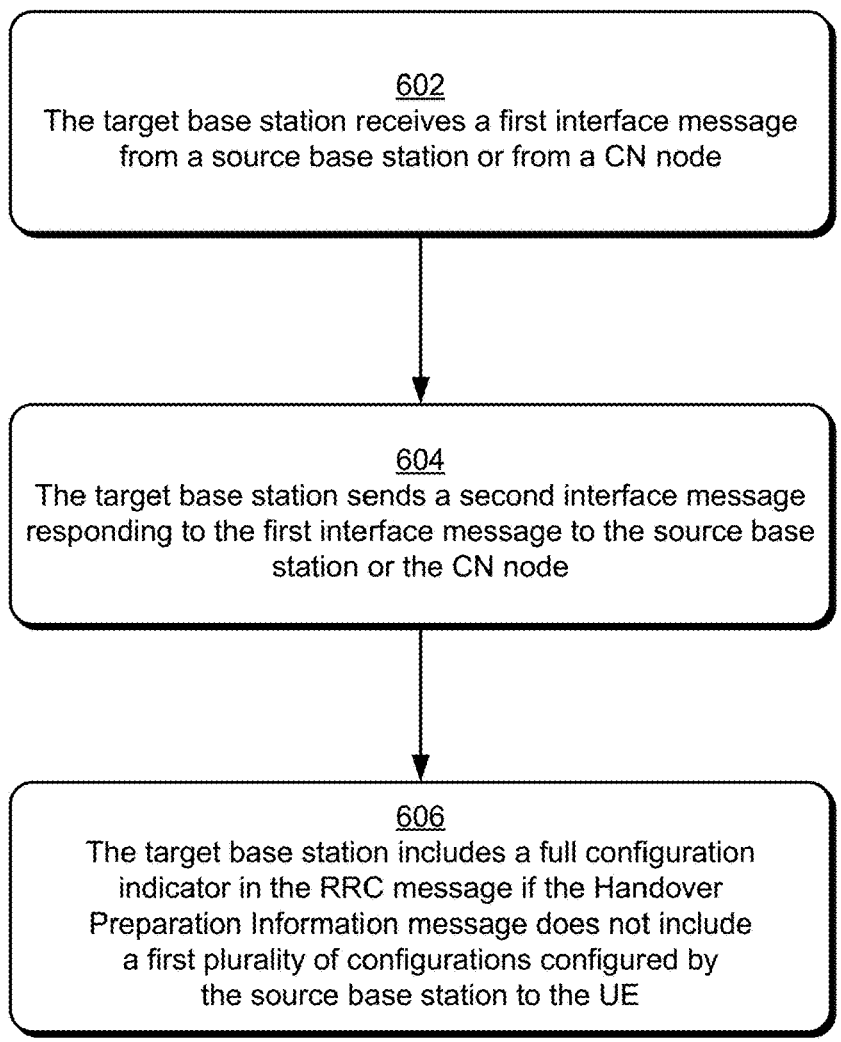
FIG. 6 illustrates an example method for configuring a handover from a perspective of a target base station and relating to methods of FIGS. 3, 4-1, and 4-2.

FIG. 6 illustrates an example method 600 for configuring a handover from a perspective of a target base station and relating to methods of FIGS. 3, 4-1, and 4-2. As noted above, method 600 of FIG. 6 is from the perspective of a target base station corresponding to methods 300 and 400 in which a source base station configures a handover. Here the portion of method 300 that corresponds to method 600 is the "Don't Use Delta" branch and for method 400, in which the source base station also determines to not use the delta configuration. Method 600 may work in conjunction with, wholly or in part, with method 300 or 400, such as, for example, block 304, block 305, and block 310 of FIG. 3, or block 410, block 412, block 414, and block 416 of FIG. 4-1 and FIG. 4-2.

At block 602, a target base station receives a first interface message from a source base station or a CN node. For example, the first interface message may be a Handover Request message from source CN 150 requesting handing over the UE 111 to the target base station. The first interface message includes a Handover Preparation Information message, such as the Handover Preparation Information message described with respect to block 304, block 306, and block 310, or block 410, block 412, and block 414.

At block 604, the target base station sends, to the source base station or the CN node, a second interface message responding to the first interface message, such as that described with reference to block 418 of FIG. 4-2. This second interface message may be a Handover Request Acknowledge message including an RRC message (for handing over the UE to the target base station).

At block 606, the target base station includes a full configuration indicator in the RRC message if the Handover Preparation Information message does not include the first plurality of configurations (e.g., set at block 402 or 502). These configurations were configured by the source base station to the UE 111 prior to the target base station receiving 602 the first interface message.

By way of example with reference to FIG. 1, 5G NR gNB base station 121 or gNB base station 123 act as source base stations and the other of these base stations or the E-UTRA ng-eNB base station 122 or eNB base station 124 act as the target base stations, with the UE being the UE 111.

Figure 7:
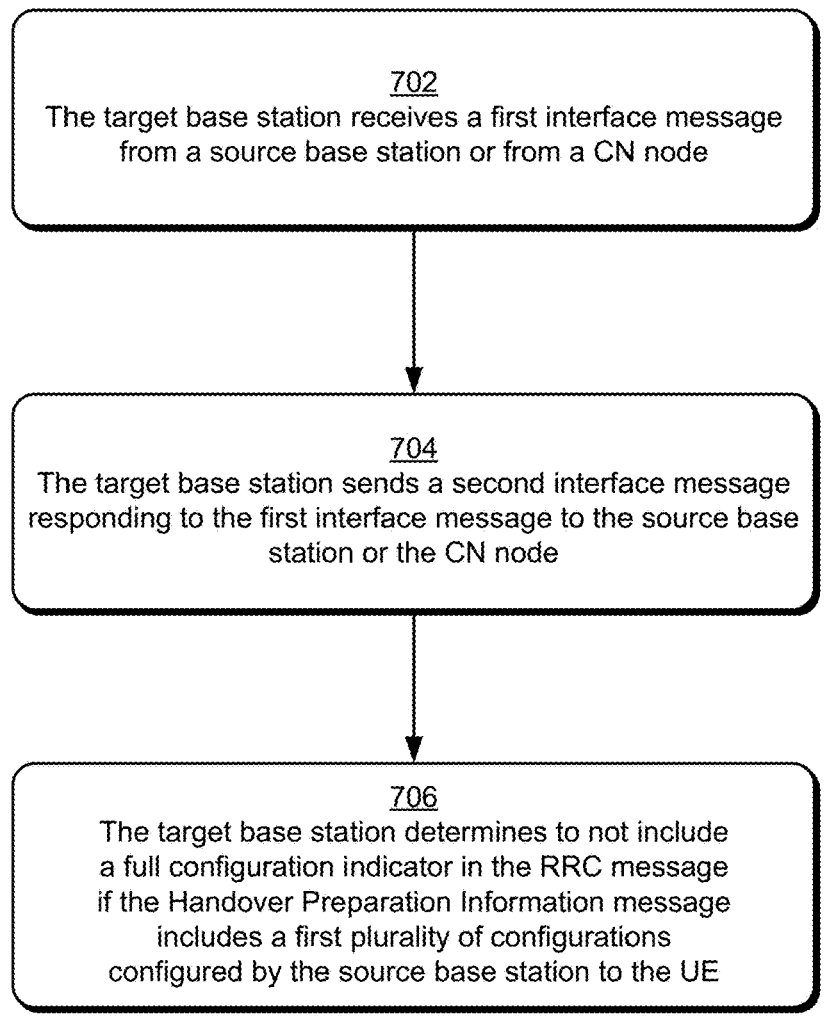
FIG. 7 illustrates an example method for configuring a handover from a perspective of a target base station and relating to methods of FIGS. 3, 5-1, and 5-2.

FIG. 7 illustrates an example method for configuring a handover from a perspective of a target base station and relating to methods of FIGS. 3, 5-1, and 5-2. As noted above, method 700 of FIG. 7 is from the perspective of a target base station corresponding to methods 300 and 500 in which a source base station configures a handover. Here the portion of method 300 that corresponds to method 700 is the "Use Delta" branch and for method 500, in which the source base station also determines to use the delta configuration. Method 700 may work in conjunction with, wholly or in part, with method 300 or 500, such as block 304, block 306, and block 308 of FIG. 3, or block 510, block 512, block 514, block 516, and/or block 518 of FIG. 5-1 and FIG. 5-2.

At block 702, a target base station receives a first interface message from a source base station or a CN node. For example, the first interface message may include be a Handover Request message requesting handing over the UE to the target base station, such as that described with reference to block 512, block 514, and block 516 of FIG. 5. The first interface message may also include a Handover Preparation Information message.

At block 704, the target base station sends, to the source base station or the CN node, a second interface message responding to a first interface message, such as that described with reference to block 518 of FIG. 5. This second interface message may be a Handover Request Acknowledge message or include an RRC message (for handing over the UE to the target base station).

At block 706, the target base station determines to not include a full configuration indicator in the RRC message if the Handover Preparation Information message includes the first plurality of configurations. The target base station generates an RRC message as described previously for block 520. Thus, if configurations sent at block 402 or 502 are included, the target base station (e.g., the handover manager 266) determines not to include the full configuration indicator. Here a plurality of delta configurations can be used.

Methods 600 and 700 may operate separately or jointly, in whole or in part, such as in a case where a target base station handles two interface message (e.g., Handover Request messages) for one or two UEs from two different source base stations.

Figures 1, 8:
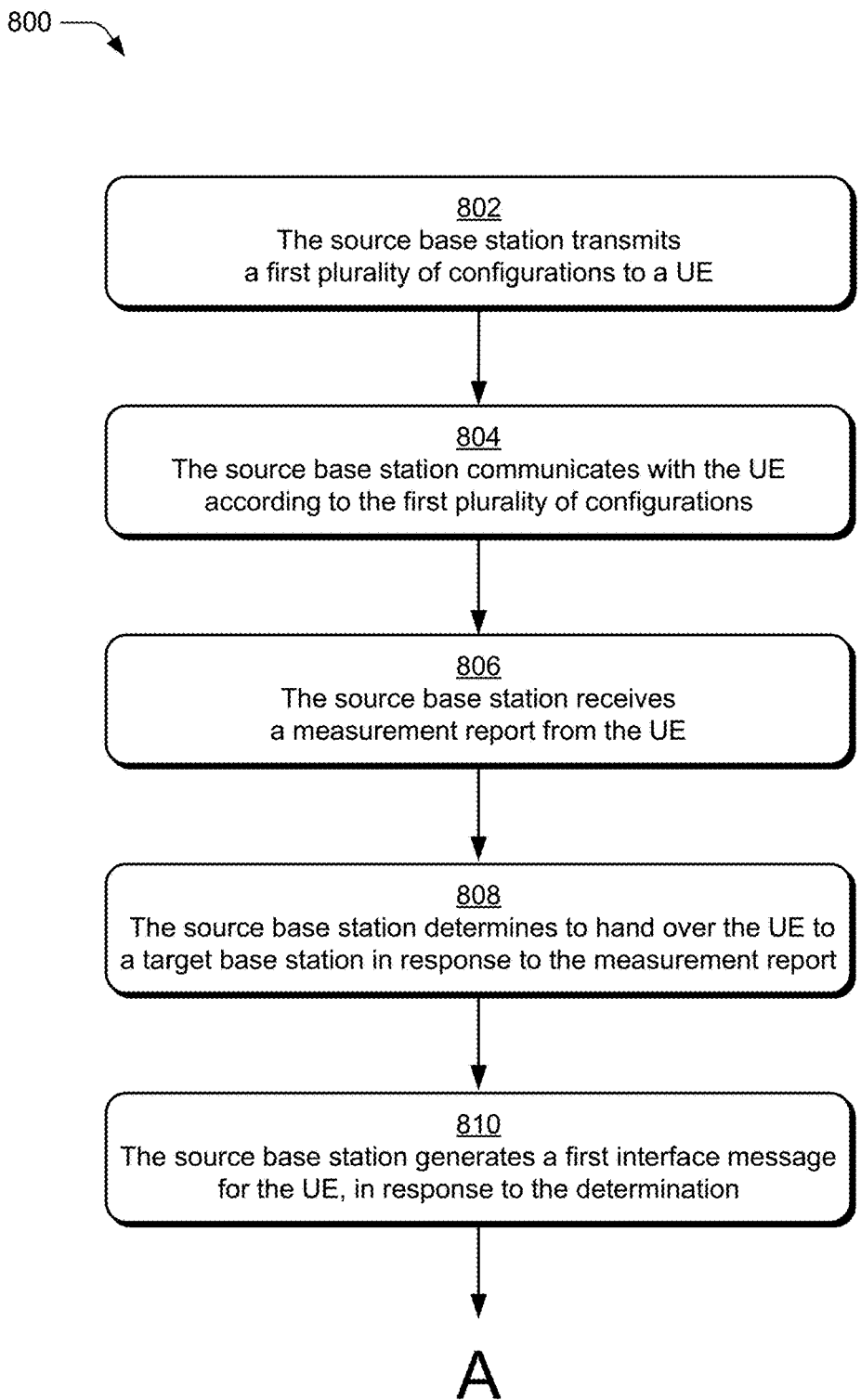
Figures 2, 8:
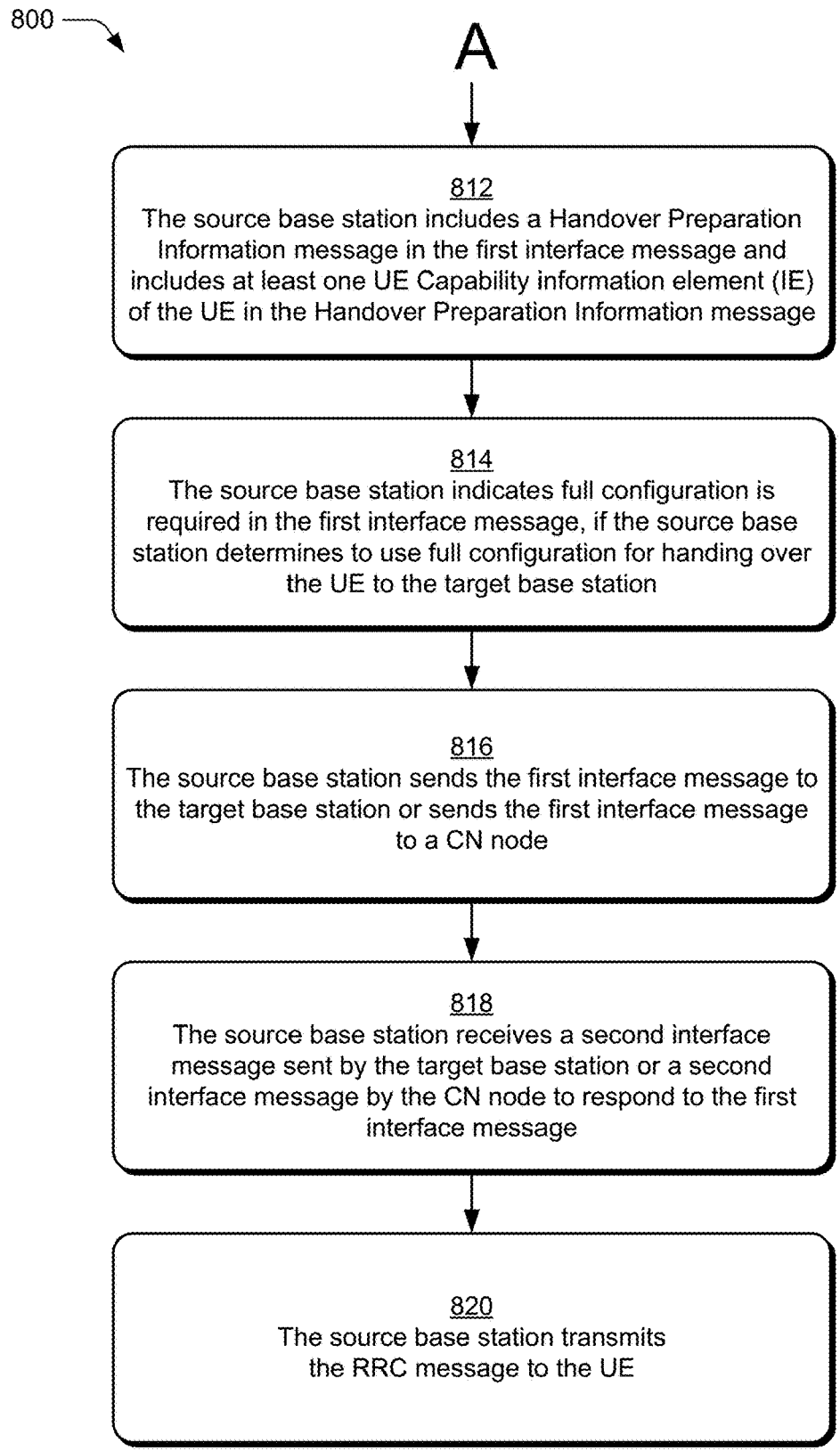

FIGS. 8-1 and 8-2 illustrates example method(s) 800 for configuring a handover as generally related to a determination to refrain from use of a delta configuration in a handover, and instead using a full configuration. Method 800 provides further details with respect to the method 300 flow-diagram branch (to block 312) for when a delta configuration will not be used, such as block 302, block 304, block 306, block 310, and/or block 312 of FIG. 3.

At block 802, a source base station transmits a first plurality of configurations to a user equipment (UE). For example, the gNB base station 121 transmits configurations to the UE 111.

At block 804, the source base station communicates with the UE according to the first plurality of configurations. These configurations are noted in part above, and permit communication to be established between the source base station and the UE (e.g., the gNB base station 121 and the UE 111).

At block 806, the source base station receives, from the UE, a measurement report. This report can be any of those described above.

With reference to block 302, at block 808, the source base station determines to handover the UE to a target base station in response to measurement report. Assume here that measurement report indicated a poor connection with the source base station, a good signal strength of the target base station, a request to switch to another base station, and so forth. Alternately or in addition, in determining to hand over the UE to the target base station, the source base station determines and/or analyzes any combination of factors, such as the type of the target base station (e.g., 5G NR, E-UTRA), a carrier frequency of the target base station, a core network of the target base station, a manufacturer, supported protocols and protocol versions, etc.

With reference to block 306 and block 310, at block 810, which may be combined with block 812, the source base station generates a first interface message for the UE in response to the determination at block 808. At block 812, the source base station includes a Handover Preparation Information message in the first interface message and includes at least one UE Capability information element (IE) of the UE in the Handover Preparation Information message. Note that blocks 810 and 812 can be combined.

In some cases, the source base station may neither include the full configuration indicator in the Handover Preparation Information message, nor in the first interface message. By so doing, the target base station can determine that the delta configuration is required or desired.

With reference to block 312, at block 814, the source base station indicates, in the Handover Preparation Information message, to use the full configuration. Note that this indication can be a new, added field to a conventional Handover Preparation Information message, such as the message shown in Table 1, below. As shown, the source base station uses this message to transfer the RRC information used by the target base station (in the case of a 5G NR target base station, such as gNB base station 123). In an alternative example, the source base station includes a full configuration indicator in the first interface message instead of in the Handover Preparation Information message. This indication indicates that the full configuration is required. If the full configuration indicator is in the first interface message (e.g., a Handover Required message) sent to the CN node (e.g., AMF 152), the CN node may include a full configuration indicator in a third interface message (e.g., a Handover Request message) sent to the target base station, to indicate the full configuration is required. The target base station is aware that the full configuration is desired according to the full configuration indicator received in the first interface message (e.g., a Handover Request message) for the third message. Thus, the target base station generates an RRC message as described for FIG. 4. The target base station sends a second interface message to the first base station in response to the first interface message, as described at block 818. The target base station sends a fourth interface message (e.g., a Handover Request message) including the RRC message to the CN node in response to the third interface message. The CN node sends the second interface message (e.g., a Handover Request message) including the RRC message to the source CN node as described at block 818. In one aspect, the target base station includes a full configuration indicator in the RRC message.

In some cases, the source base station may neither include the full configuration indicator in the Handover Preparation Information message nor in the first interface message. By so doing, the target base station can determine that the delta configuration is required or desired.

TABLE 1

| HandoverPreparationInformation message |
|---|

```
-- ASN1START
-- TAG-HANDOVER-PREPARATION-INFORMATION-START
HandoverPreparationInformation ::=      SEQUENCE {
    criticalExtensions                  CHOICE {
        c1                              CHOICE{
            handoverPreparationInformation    HandoverPreparationInformation-IEs,
            spare3 NULL, spare2 NULL, spare1 NULL
        },
        criticalExtensionsFuture        SEQUENCE { }
    }
}
HandoverPreparationInformation-IEs ::= SEQUENCE {
    ue-CapabilityRAT-List           UE-CapabilityRAT-ContainerList,
    sourceConfig                    AS-Config               OPTIONAL,
    rrm-Config                      RRM-Config              OPTIONAL,
    as-Context                      AS-Context              OPTIONAL,
    nonCriticalExtension            SEQUENCE { }            OPTIONAL
}
AS-Config ::=   SEQUENCE {
    rrcReconfiguration              OCTET STRING (CONTAINING RRCReconfiguration),
    ...
}
AS-Context ::=                      SEQUENCE {
    reestablishmentInfo             ReestablishmentInfo     OPTIONAL,
    configRestrictInfo              ConfigRestrictInfoSCG   OPTIONAL,
    ...,
    [[      ran-NotificationAreaInfo    RAN-AreaInfo    OPTIONAL
    ]]
}
ReestablishmentInfo ::=             SEQUENCE {
    sourcePhysCellId                PhysCellId,
    targetCellShortMAC-I            ShortMAC-I,
    additionalReestabInfoList       ReestabNCellInfoList    OPTIONAL
}
ReestabNCellInfoList ::=        SEQUENCE ( SIZE (1..maxCellPrep) ) OF ReestabNCellInfo
ReestabNCellInfo::=  SEQUENCE{
    cellIdentity                    CellIdentity,
    key-gNodeB-Star                         BIT STRING (SIZE (256)),
    shortMAC-I                              ShortMAC-I
}
RRM-Config ::=                  SEQUENCE {
    ue-InactiveTime                 ENUMERATED {
                                        s1, s2, s3, s5, s7, s10, s15, s20,
                                        s25, s30, s40, s50, min1, min1s20c, min1s40,
                                        min2, min2s30, min3, min3s30, min4, min5, min6,
                                        min7, min8, min9, min10, min12, min14, min17, min20,
                                        min24, min28, min33, min38, min44, min50, hr1,
                                        hr1min30, hr2, hr2min30, hr3, hr3min30, hr4, hr5, hr6,
                                        hr8, hr10, hr13, hr16, hr20, day1, day1hr12, day2,
                                        day2hr12, day3, day4, day5, day7, day10, day14, day19,
                                        day24, day30, dayMoreThan30}  OPTIONAL,
    candidateCellInfoList           MeasResultList2NR       OPTIONAL,
    ...
}
-- TAG-HANDOVER-PREPARATION-INFORMATION-STOP
-- ASN1STOP
```

Table 2 includes field descriptions for the Handover Preparation Information of Table 1.

TABLE 2

| HandoverPreparationInformation field descriptions |
|---|
| as-Context |
| Local RAN context required by the target gNB. |
| sourceConfig |
| The radio resource configuration as used in the source cell. This field is absent when the source base station uses the full configuration option. |
| rrm-Config |
| Local RAN context used mainly for RRM purposes. |
| ue-CapabilityRAT-List |

TABLE 2-continued

| HandoverPreparationInformation field descriptions |
|---|
| The UE radio access related capabilities concerning RATs supported by the UE. FFS whether certain capabilities are mandatory to provide by source e.g., of target and/or source RAT. |

At block 816, the source base station sends the first interface message to the target base station or sends the first interface message to a CN (core network) node. Thus, the source base station (e.g., the gNB base station 121), send the first interface message to the target base station (e.g., the gNB base station 123, the ng-eNB base station 122 or the eNB base station 124).

At block 818, in response to sending the first interface message, the source base station receives a second interface message sent by the target base station or the CN node. The second interface message includes information, such as the information of the RRC message described for FIG. 4.

At block 820, the source base station transmits a Radio Resource Control (RRC) message to the UE. In implementations, the source base station analyzes the combination of factors associated with performing the handover that affect the first plurality of configurations (e.g., the type of the target base station, a carrier frequency of the target base station, a core network of the target base station, a manufacturer, supported protocols and protocol versions, etc.) to assemble and/or modify the RRC message transmitted to the UE. In response to receiving the RRC message, the UE may release a MAC or RLC entity.

Figure 9:
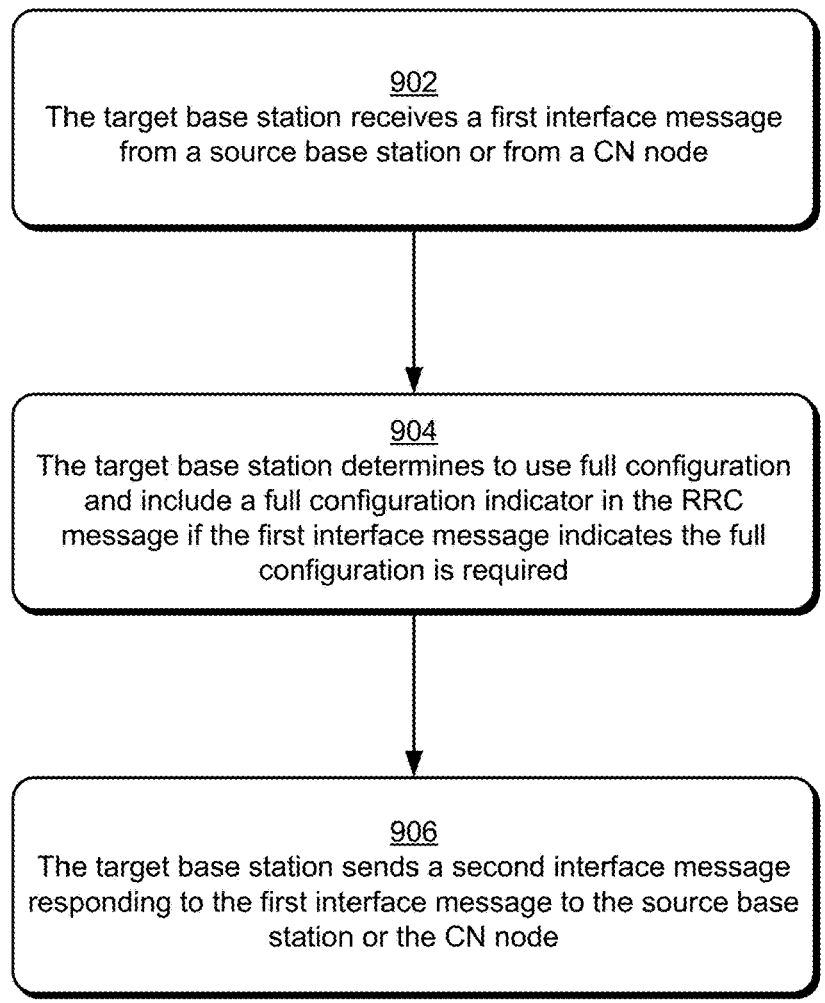
FIG. 9 illustrates an example method for configuring a handover from a perspective of a target base station and relating to methods of FIGS. 3, 8-1, and 8-2.

FIG. 9 illustrates an example method for configuring a handover from a perspective of a target base station and relating to methods of FIGS. 3, 8-1, and 8-2. Method 900 of FIG. 9 is from the perspective of a target base station corresponding to methods 300 and 800 in which a source base station configures a handover. Here the portion of method 300 that corresponds to method 900 is the "Don't Use Delta" branch (to block 310) and for method 800, in which the source base station also determines to not use the delta configuration. Method 900 may work in conjunction with, wholly or in part, with methods 300 or 800.

At block 902, a target base station receives a first interface message from a source base station or a CN node. For example, the first interface message may include a handover request message requesting handing over the UE to the target base station, such as that described with reference to block 304, block 306, and block 310 of FIG. 3 and/or block 810, block 812, block 814, and block 816 of FIG. 8-1 and FIG. 8-2. The first interface message may also include a Handover Preparation Information message.

At block 904, the target base station determines to use a full configuration and includes an indicator in the RRC message. The target base station can make this determination based on the Handover Preparation Information message not including the first plurality of configurations noted in blocks 402 or 502. Thus, if the first plurality of configurations sent at block 402 or 502 are not included (or an indication of full configuration is received), the target base station (e.g., the handover manager 266) determines to include the full configuration in the second configuration message.

At block 906, the target base station sends, to the source base station or the CN node, a second interface message responding to a first interface message, such as that described with reference to block 818 of FIG. 8-2. This second interface message may be a Handover Request Acknowledge message. In one example, this Handover Request Acknowledge message can be an Xn message (3GPP TS 38.423) sent by the target base station to the source base station or be a NG message (3GPP TS 38.413) sent by the target to the CN node).

Figures 1, 10:
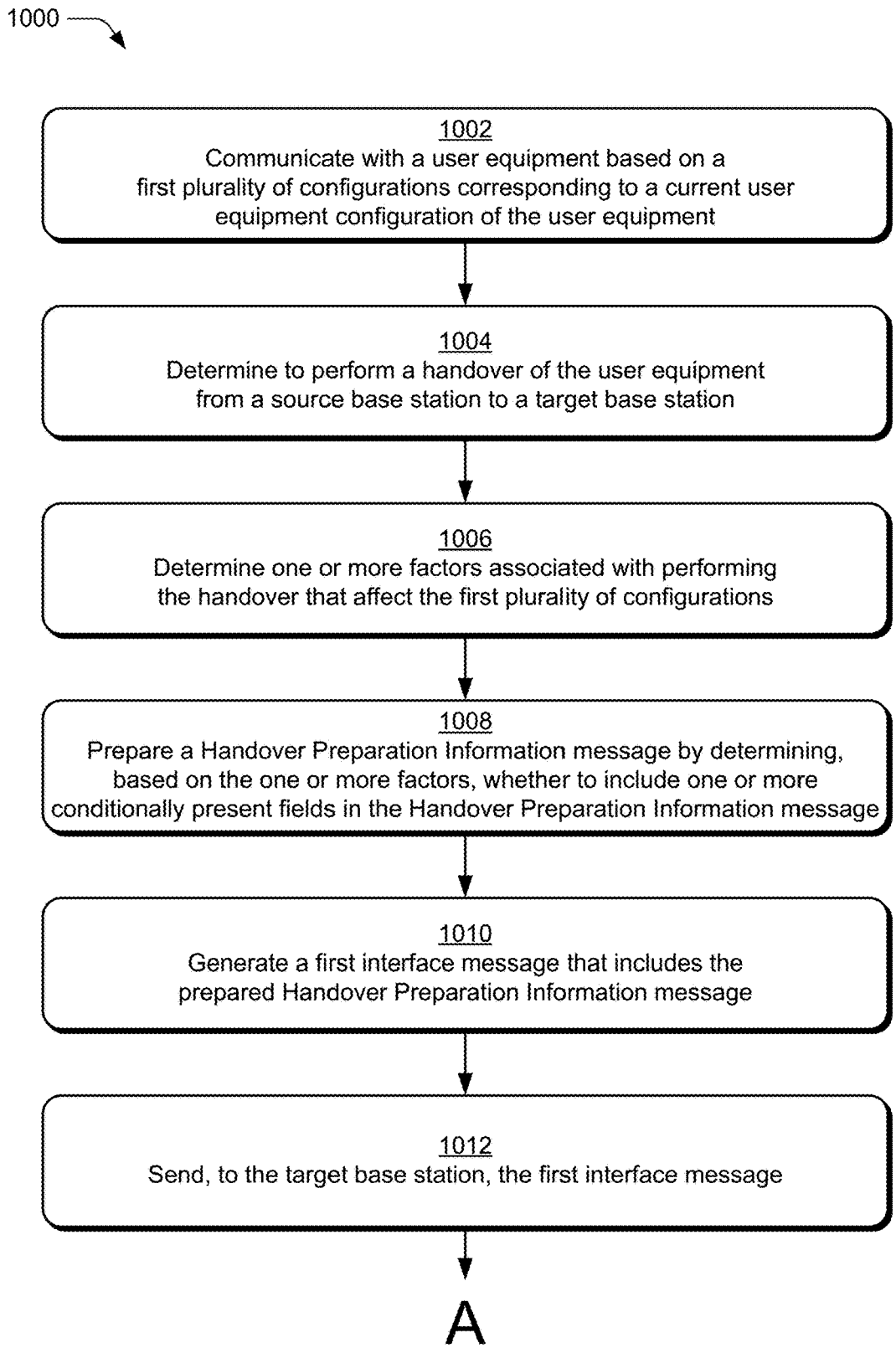
Figures 2, 10:
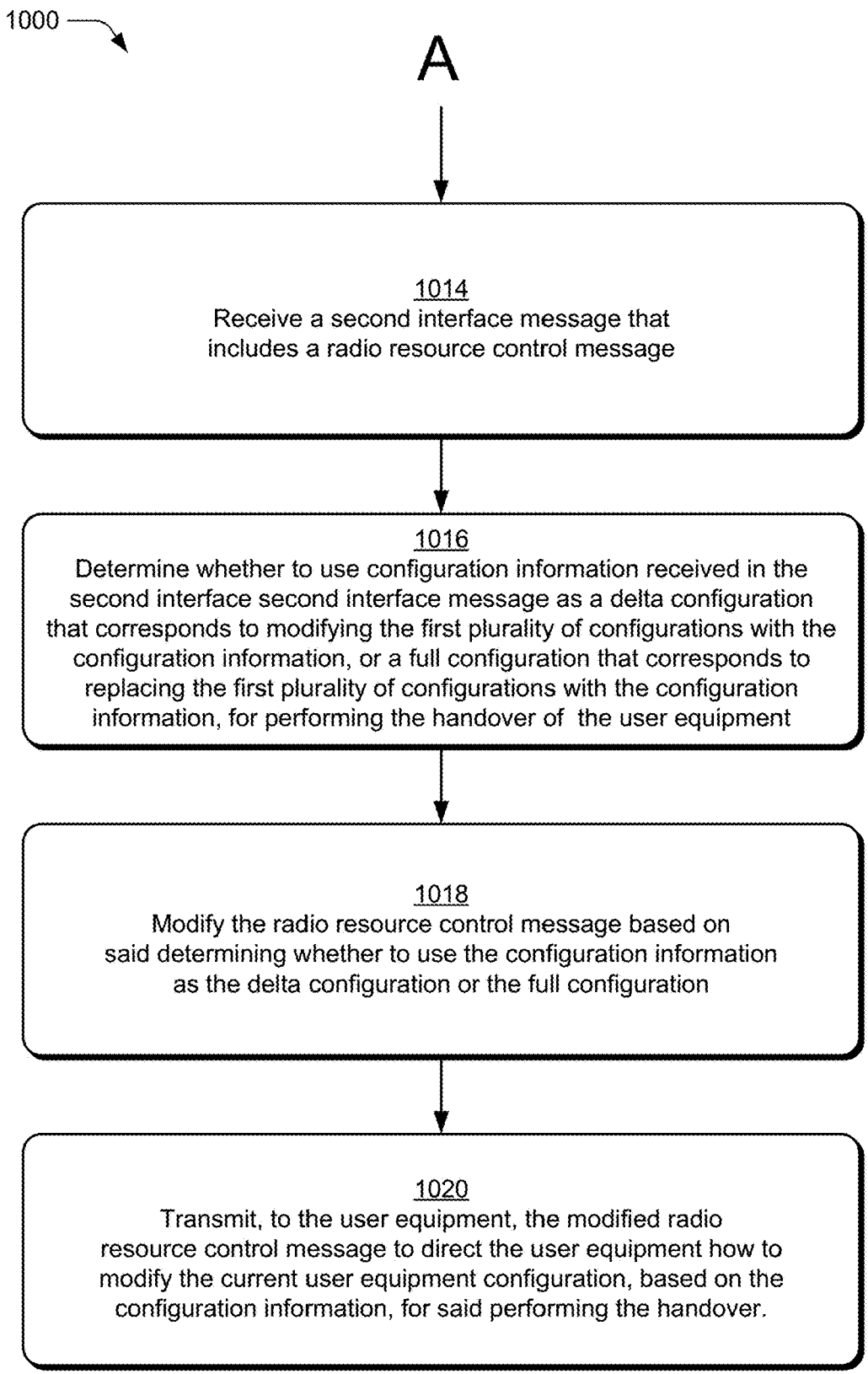

FIGS. 10-1 and 10-2 illustrate example method(s) 1000 that are from the perspective of a source base station. Example method(s) 1000 can be employed for performing a handover as generally related to configuring and/or processing messages that include optional and/or conditionally present fields based on one or more factors. Method 1000 may work in conjunction with, wholly or in part, with methods 300, 400, 500, or 800.

At block 1002, a source base station communicates with a user equipment based on a first plurality of configurations corresponding to a current user equipment configuration of the user equipment, such as that described with reference to block 404 of FIG. 4-1, block 504 of FIG. 5-1, and/or block 804 of FIG. 8-1. For example, the gNB base station 121 communicates with the UE 111 over wireless links 131. As another example, the ng-eNB base station 122 communicates with the UE 111 over the wireless link 132.

At block 1004, the source base station determines to perform a handover of the user equipment from a source base station to a target base station, such as that described with reference to block 302 of FIG. 3, block 408 of FIG. 4-1, block 508 of FIG. 5-1, and/or block 808 of FIG. 8-1. To illustrate, the gNB base station 121 determines to hand over the UE 111 to the gNB base station 123 or the ng-eNB base station 122. Alternately or additionally, the ng-eNB base station 122 determines to hand over the UE 111 to the eNB base station 124 or the gNB base station 123. In some implementations, the eNB base station 124 determines to hand over to the gNB base station 121 or the gNB base station 123.

At block 1006, the source base station determines one or more factors associated with performing the handover that affect the first plurality of configurations, such as that described with reference to block 306 of FIG. 3. To illustrate, the source base station, such as the gNB base station 121, determines any number and combination of factors, such as the type of the target base station (e.g., gNB, eNB, ng-eNB), a carrier frequency of the target base station, a core network of the target base station, a manufacturer, supported protocols and protocol versions, etc. Alternately or additionally, determining the one or more factors can include determining a type of the source base station (e.g., gNB, eNB, ng-eNB). The target base station and/or the source base station can be any suitable type of a base station, such as the gNB base station 123, the ng-eNB base station 122, the eNB base station 124, etc.

At block 1008, which may be combined with block 1010, the source base station prepares a Handover Preparation Information message by determining, based on the one or more factors, whether to include one or more conditionally present fields in the Handover Preparation Information message, such as that described with reference to block 308 or block 310 of FIG. 3, block 412 and block 414 of FIG. 4-2, block 512 and block 514 of FIG. 5-2, or block 812 and block 814 of FIG. 8-2. In one example, the source base station is the gNB base station 121, the target base station is the gNB base station 123, and the gNB base station 121 prepares the Handover Preparation Information message by determining to include the one or more conditionally present fields in the Handover Preparation Information message. In another example, the source base station is the eNB base station 124, the target base station is the gNB base station 123, and the eNB base station 124 prepares the Handover Preparation Information message by determining to exclude at least one of the one or more conditionally present fields from the Handover Preparation Information message. In yet another example, the source base station is the ng-eNB base station 122, the target base station is the gNB base station 123, and the ng-eNB base station 122 prepares the Handover Preparation Information message by determining to optionally include at least one of the one or more conditionally present fields from the Handover Preparation Information message. The conditionally present fields can be any suitable type of field, such as the first plurality of configurations. Alternately or additionally the conditionally present fields can include portions, or all of, an RRC reconfiguration message.

At block 1010, the source base station generates a first interface message that includes the prepared Handover Preparation Information message, such as that described with reference to block 1008, block 308 or block 310 of FIG. 3, block 412 and block 414 of FIG. 4-2, block 512 and block 514 of FIG. 5-2, or block 812 and block 814 of FIG. 8-2. Accordingly, at block 1012, the source base station sends the first interface message to the target base station. Thus, in at least one example, the ng-eNB base station 122 sends the first interface message to the gNB base station 123. In another example, the gNB base station 121 sends the first interface message to the gNB base station 123. Alternately or additionally, the source base station sends the first interface message to a CN node, such as EPC 160 and/or MME 162. Thus, it is to be appreciated that various combinations of source base stations, target base stations, and/or core networks can be utilized in performing the handover, such as by the gNB base station 121 sending the first interface message to the ng-eNB base station 122, by the gNB base station 121 sending the first interface message to AMF 152, etc.

At block 1014, the source base station receives a second interface message that includes an RRC message, such as that described with reference to block 418 of FIG. 4-2, block 518 of FIG. 5-2, or block 818 of FIG. 8-2. The gNB base station 121, for example, receives the second interface message from the gNB base station 123 or the ng-eNB base station 122. The ng-eNB base station 122, as another example, receives the second interface message from the gNB base station 123. As yet another example, the gNB base station 121 receives the second interface message from 5G Core Network (150) and/or AMF (152). Thus, as further described herein, performing the handover can include receiving the second interface message from a CN node.

In response to receiving the second interface message, the source base station determines whether to use configuration information received in the second interface message as a delta configuration that corresponds to modifying the first plurality of configurations with the configuration information, or a full configuration that corresponds to replacing the first plurality of configurations with the configuration information, for performing the handover of the user equipment at block 1016, with reference to block 312 of FIG. 3, block 420 of FIG. 4-2, block 520 of FIG. 5-2, and/or block 820 of FIG. 802. At times, block 1016 may be combined with block 1018 and/or block 1020. As one example of determining, the eNB base station 124 determines that the RRC message excludes a full configuration indicator and determines to use the configuration information as the delta configuration. As another example, the gNB base station 121 determines that the RRC message includes the full configuration indicator and determines to use the configuration information as the full configuration. In one or more implementations, the source base station analyzes the one or more factors associated with performing the handover to determine whether to use the configuration information received in the second interface message as the delta configuration or the full configuration At block 1018, the source base station modifies the RRC message based on the determining whether to use the configuration information as the delta configuration or the full configuration, with reference to block 312 of FIG. 3, block 420 of FIG. 4-2, block 520 of FIG. 5-2, and/or block 820 of FIG. 802. To illustrate, and with reference to block 1016, the eNB base station 124 configures the RRC message to exclude the full configuration indicator. As another example, the gNB base station 121 configures the RRC message to include the full configuration indicator.

At block 1020, the source base station transmits, to the user equipment, the modified RRC message to direct the user equipment to modify the current user equipment configuration, based on the configuration information, for the performing the handover, with reference to block 312 of FIG. 3, block 420 of FIG. 4-2, block 520 of FIG. 5-2, and/or block 820 of FIG. 802. This can include the ng-eNB base station 122 transmitting the configured RRC message to the UE 111, the gNB base station 121 transmitting the configured RRC to UE 111, and so forth. As further described herein, the RRC message can include a RRC handover command message, such as an RRCConnectionReconfiguration message for handover from NR to E-UTRA (e.g., from gNB base station 121 to ng-eNB base station 122 or eNB 124) or an RRCReconfiguration message for handover from E-UTRA to NR (e.g., from ng-eNB base station 122 or eNB base station 124 to gNB base station 121) or for handover from NR to NR (e.g., from gNB base station 121 to gNB base station 123).

Figure 11:
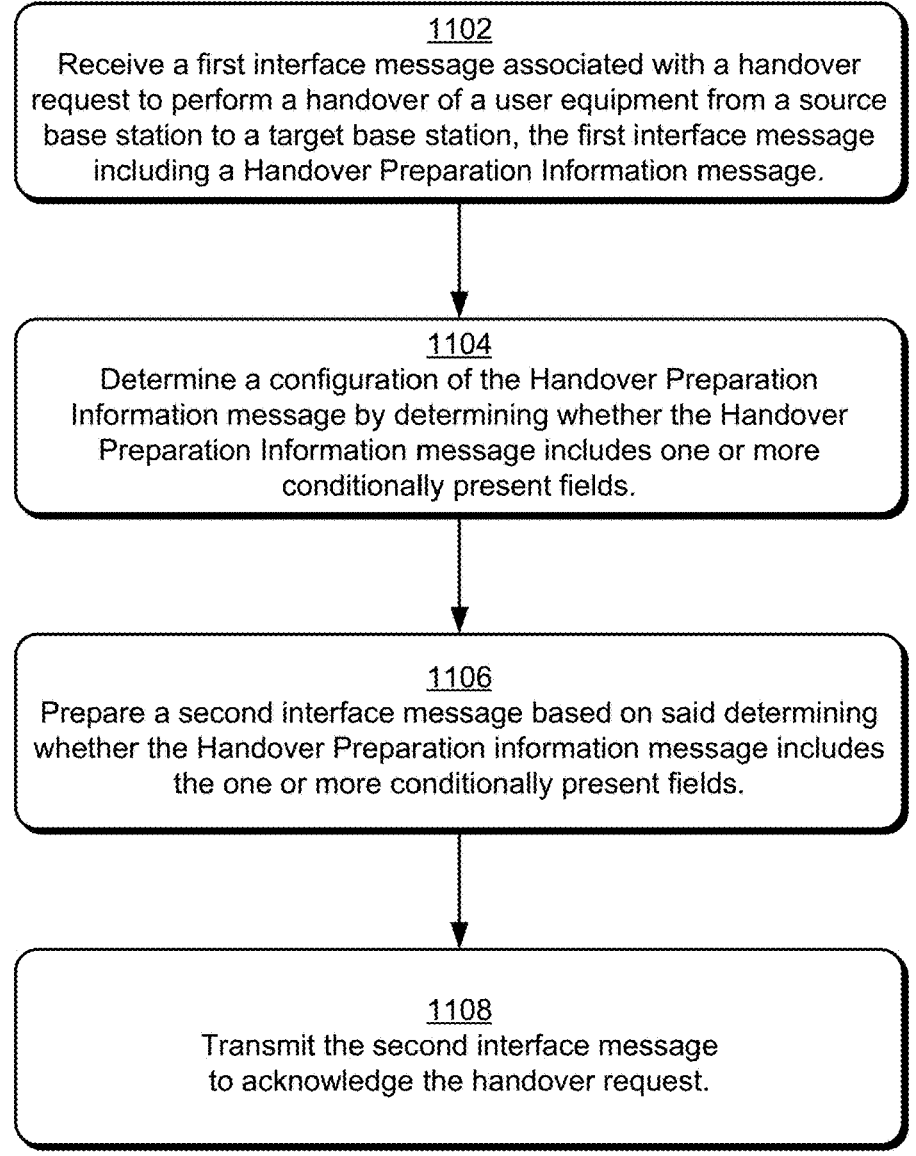
FIG. 11 illustrates an example method for configuring a handover from a perspective of a target base station and relating to methods of FIGS. 3, 6-1 and 6-1, 7-1 and 7-1, and 9-1- and 9-2.

FIG. 11 illustrates an example method 1100 that is from the perspective of a target base station. Example method(s) 1100 can be employed for performing a handover as generally related to configuring and/or processing messages that include optional and/or conditionally present fields based on one or more factors. Method 1000 may work in conjunction with, wholly or in part, methods 300, 600, 700, or 900.

At block 1102, a target base station receives a first interface message associated with a handover request to perform a handover a user equipment from a source base station to a target base station, the first interface message including a Handover Preparation Information message, such as that described with reference to block 308 or block 310 of FIG. 3, block 602 of FIG. 6, block 702 of FIG. 7, or block 902 of FIG. 9. The gNB base station 123, for instance, receives the first interface message from the gNB base station 121 or the ng-eNB base station 122. As another example, the eNB base station 124 receives the first interface message from the gNB base station 121. Thus, the target base station and the source base station can be any combination of a 5G NR base station, an eNB base station, an ng-eNB base station, and so forth.

At block 1104, the target base station determines a configuration of the Handover Preparation Information message by determining whether the Handover Preparation Information message includes one or more conditionally present fields, such as that described with reference to block 604 and block 606 of FIG. 6, block 704 and block 706 of FIG. 7, or block 904 and block 906 of FIG. 9. In implementations, block 1104 may be combined with block 1106 and block 1108. For example, the eNB base station 124 determines that the Handover Preparation Information message excludes a plurality of configurations corresponding to a current user equipment configuration of the user equipment associated with the handover. Alternately or additionally, in response to determining the Handover Preparation Information excludes the conditionally present plurality of configurations, the eNB base station 124 determines to perform the handover using a delta configuration. As another example, the gNB base station 123 determines that the Handover Preparation Information message includes the plurality of configurations corresponding to the current user equipment configuration and, alternately or additionally, determines to perform the handover using a full configuration.

At block 1106, the target base station prepares a second interface message based on the determining whether the Handover Preparation information message includes the one or more conditionally present fields, such as that described with reference to block 604 and block 606 of FIG. 6, block 704 and block 706 of FIG. 7, or block 904 and block 906 of FIG. 9. For example, in some instances where the second interface message includes an RRC message, the eNB base station 124 configures the second interface message by excluding a full configuration indicator from the RRC message based on determining the Handover Preparation Information message includes the plurality of configurations. As another example, the gNB base station 123 configures the second interface message by including the full configuration indicator in the RRC message based on determining the Handover Preparation Information message excludes the plurality of configurations.

With reference to block 604 of FIG. 6, block 704 of FIG. 7, or block 904 of FIG. 9, and in response to configuring the second interface message, the target base station transmits the second interface message to acknowledge the handover request at block 1108. For example, the gNB base station 123 transmits the second interface message to the gNB base station 121 and/or the ng-eNB base station 122.

Although aspects for configuring a handover have been described in language specific to features and/or methods, the subject of the appended claims is not necessarily limited to the specific features or methods described. Rather, the specific features and methods are disclosed as example implementations of the inter-radio access technology handover, and other equivalent features and methods are intended to be within the scope of the appended claims. Further, various aspects are described, and it is to be appreciated that each described aspect can be implemented independently or in connection with one or more other described aspects.

What is claimed is:

1. A method performed by a source base station for performing a handover from the source base station to a target base station, the method comprising:
   communicating, by the source base station, with a user equipment based on a source configuration corresponding to a current user equipment configuration for communicating with the source base station;
   deciding, based on a measurement report from the user equipment, to perform the handover of the user equipment from the source base station to the target base station;
   determining to include a conditionally present field in a Handover Preparation Information message when the source base station is connected to a fifth-generation core network, the conditionally present field comprising at least a portion of the source configuration;
   generating a first interface message that includes the Handover Preparation Information message; and
   sending, to the target base station, the first interface message.

2. The method as recited in claim 1, further comprising:
   receiving, by the source base station, a second interface message, the second interface message including a radio resource control message;
   deciding, by the source base station, whether to use configuration information received in the second interface message for performing the handover of the user equipment as a delta configuration that modifies the source configuration or a full configuration that replaces the source configuration;
   modifying the radio resource control message based on the deciding whether to use the configuration information as the delta configuration or the full configuration; and
   transmitting, to the user equipment, the modified radio resource control message to direct the user equipment to modify the current user equipment configuration, based on the configuration information, for the performing the handover.

3. The method as recited in claim 2, wherein the deciding whether to use the configuration information received in the second interface message as the delta configuration or the full configuration comprises:
   analyzing a manufacturer of the target base station.

4. The method as recited in claim 2, wherein the deciding whether to use the configuration information received in the second interface message as the delta configuration or the full configuration comprises:
   analyzing a carrier frequency of the target base station.

5. The method as recited in claim 2, wherein the deciding whether to use the configuration information received in the second interface message as the delta configuration or the full configuration comprises analyzing one or more of:
   a type of the target base station;
   a supported protocol of the target base station; or
   a core network of the target base station.

6. The method as recited in claim 1, wherein the determining to include the conditionally present field comprises:
   including the conditionally present field in the Handover Preparation Information message when the source base station is a first fifth-generation new radio base station.

7. The method as recited in claim 6, wherein the target base station is a second fifth-generation new radio base station.

8. The method as recited in claim 1, wherein the determining to include the conditionally present field comprises:
   including the conditionally present field in the Handover Preparation Information message when the source base station is an evolved NodeB base station connected to the fifth-generation core network and when the target base station is a fifth-generation new radio base station.

9. The method as recited in claim 8, wherein the generating the first interface message comprises:
   including one or more user equipment capability information elements in the first interface message.

10. The method as recited in claim 1, wherein the determining to include the conditionally present field in the Handover Preparation Information message comprises:
    analyzing a manufacturer of the target base station.

11. The method as recited in claim 1, further comprising:
    analyzing one or more factors associated with performing the handover that affect the source configuration to determine whether to perform the handover using a delta configuration that modifies the source configuration or a full configuration that replaces the source configuration.

12. The method as recited in claim 11, wherein the analyzing the one or more factors associated with the performing the handover that affect the source configuration comprises analyzing one or more of:
    a type of the target base station;
    a supported protocol of the target base station; or
    a core network of the target base station.

13. The method as recited in claim 1, further comprising:
    wherein the method further comprises:

receiving, from the target base station, a second interface message that includes a second plurality of configurations that correspond to a full configuration from the target base station.

14. The method as recited in claim 13, further comprising: including, in the Handover Preparation Information message, a full configuration indicator that requests the full configuration from the target base station.

15. A method performed by a target base station for performing a handover of a user equipment from a source base station to the target base station, the method comprising:
receiving, by the target base station, a Handover Preparation Information message associated with a handover request to perform the handover of the user equipment from the source base station to the target base station;
identifying whether the Handover Preparation Information message includes a conditionally present field, the conditionally present field being a source configuration corresponding to a current user equipment configuration for communicating with the source base station;
preparing, based on identifying whether the Handover Preparation Information message includes the conditionally present field, a second interface message by determining whether to include or exclude a full configuration indicator that specifies whether the second interface message includes a delta configuration that modifies the source configuration or a full configuration that replaces the source configuration; and
transmitting, by the target base station, the second interface message to acknowledge the handover request.

16. The method as recited in claim 15, wherein the identifying whether the Handover Preparation Information message includes the conditionally present field comprises:
determining the Handover Preparation Information message includes the conditionally present field, and
wherein the preparing the second interface message comprises:
excluding the full configuration indicator from the second interface message based on the determining the Handover Preparation Information message includes the conditionally present field.

17. The method as recited in claim 16, wherein the second interface message includes a radio resource control message, and
wherein the excluding the full configuration indicator in the second interface message comprises excluding the full configuration indicator from the radio resource control message.

18. The method as recited in claim 15, wherein receiving the Handover Preparation Information message further comprises:
receiving, in the Handover Preparation Information message, at least a portion of the source configuration corresponding to the current user equipment configuration, and
wherein preparing the second interface message further comprises:
including, in the second interface message, a second plurality of configurations that correspond to a full configuration from the target base station.

19. The method as recited in claim 18, wherein receiving the Handover Preparation Information message further comprises:
receiving, in the Handover Preparation Information message, a full configuration indicator that requests the full configuration from the target base station.

20. A base station apparatus comprising:
a wireless transceiver;
a processor; and
computer-readable storage media comprising instructions to implement a handover manager, the handover manager, responsive to execution by the processor, directs the base station apparatus to perform operations comprising:
communicating, by the base station apparatus, with a user equipment based on a source configuration corresponding to a current user equipment configuration for communicating with the base station apparatus;
deciding, based on a measurement report from the user equipment, to perform a handover of the user equipment from the base station apparatus to a target base station;
determining to include a conditionally present field in a Handover Preparation Information message when the base station apparatus is connected to a fifth-generation core network, the conditionally present filed comprising at least a portion of the source configuration;
generating a first interface message that includes the Handover Preparation Information message; and
sending, to the target base station, the first interface message.

21. The base station apparatus as recited in claim 20, wherein the computer-readable storage media comprising further instructions that direct the base station apparatus to perform operations comprising:
receiving, by the base station apparatus, a second interface message, the second interface message including a radio resource control message;
deciding, by the base station apparatus, whether to use configuration information received in the second interface message for performing the handover of the user equipment as a delta configuration that modifies the source configuration or a full configuration that replaces the source configuration;
modifying the radio resource control message based on the deciding whether to use the configuration information as the delta configuration or the full configuration; and
transmitting, to the user equipment, the modified radio resource control message to direct the user equipment to modify the current user equipment configuration, based on the configuration information, for the performing the handover.

22. The base station apparatus as recited in claim 20, wherein the determining to include the one or more conditionally present fields comprises:
including the conditionally present field in the Handover Preparation Information message when the base station apparatus is a first fifth-generation new radio base station and the target base station is a second fifth-generation new radio base station.

23. The base station apparatus as recited in claim 20 wherein the determining to include the conditionally present field in the Handover Preparation Information message comprises:
determining to include the conditionally present field in the Handover Preparation Information message when the base station apparatus is an evolved universal terrestrial radio access base station connected to a fifth-generation core network and the target base station is a fifth-generation new radio base station.

24. The base station apparatus as recited in claim 23, wherein the generating the first interface message comprises:

including one or more user equipment capability information elements in the first interface message.

25. The base station apparatus as recited in claim 20, wherein the determining to include the one or more conditionally present fields comprises:

including the conditionally present field in the Handover Preparation Information message when the base station apparatus is a next-generation evolved NodeB base station and the target base station is a fifth-generation new radio base station.

\* \* \* \* \*